(12) United States Patent
Michaels et al.

(10) Patent No.: US 8,145,692 B2
(45) Date of Patent: Mar. 27, 2012

(54) DIGITAL GENERATION OF AN ACCELERATED OR DECELERATED CHAOTIC NUMERICAL SEQUENCE

(75) Inventors: Alan J. Michaels, West Melbourne, FL (US); David B. Chester, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 972 days.

(21) Appl. No.: 12/129,197

(22) Filed: May 29, 2008

(65) Prior Publication Data
US 2009/0327387 A1    Dec. 31, 2009

(51) Int. Cl.
*G06F 1/02* (2006.01)
*G06F 7/38* (2006.01)

(52) U.S. Cl. ................... 708/250; 708/491; 708/492

(58) Field of Classification Search .............. 708/491, 708/492, 250, 254
See application file for complete search history.

(56) References Cited

U.S. PATENT DOCUMENTS

| | | | |
|---|---|---|---|
| 3,564,223 A | 2/1971 | Harris et al. | |
| 4,095,778 A | 6/1978 | Wing | |
| 4,646,326 A | 2/1987 | Backof, Jr. et al. | |
| 4,703,507 A | 10/1987 | Holden | |
| 5,007,087 A | 4/1991 | Bernstein et al. | |
| 5,048,086 A | 9/1991 | Bianco et al. | |
| 5,077,793 A | 12/1991 | Falk et al. | |
| 5,276,633 A | 1/1994 | Fox et al. | |
| 5,297,153 A | 3/1994 | Baggen et al. | |
| 5,297,206 A | 3/1994 | Orton | |
| 5,319,735 A | 6/1994 | Preuss et al. | |
| 5,412,687 A | 5/1995 | Sutton et al. | |
| 5,598,476 A | 1/1997 | LaBarre et al. | |
| 5,646,997 A | 7/1997 | Barton | |
| 5,757,923 A | 5/1998 | Koopman, Jr. | |
| 5,811,998 A | 9/1998 | Lundberg et al. | |
| 5,852,630 A | 12/1998 | Langberg et al. | |
| 5,900,835 A | 5/1999 | Stein | |
| 5,924,980 A | 7/1999 | Coetzee | |
| 5,937,000 A | 8/1999 | Lee et al. | |
| 6,014,446 A | 1/2000 | Finkelstein | |

(Continued)

FOREIGN PATENT DOCUMENTS

EP    0 849 664 A2    6/1998

(Continued)

OTHER PUBLICATIONS

Abel, et al., "Chaos Communications-Principles, Schemes, and System Analysis" Proceedings for the IEEE, IEEE. New York, NY. vol. 90, No. 5, May 1, 2002, XP011064997, ISSN: 0018-9219.

(Continued)

*Primary Examiner* — Chuong D Ngo
(74) *Attorney, Agent, or Firm* — Fox Rothschild, LLP; Robert J. Sacco

(57) ABSTRACT

A method for generating an accelerated and/or decelerated chaotic sequence. The method involves selecting a plurality of polynomial equations constructed from an acc-dec variable v. The method also involves selecting a value for the acc-dec variable v for advancing or stepping back a chaotic sequence generation by at least one cycle at a given time. The method further involves using residue number system (RNS) arithmetic operations to respectively determine solutions for the polynomial equations using the acc-dec variable v. The solutions iteratively computed and expressed as RNS residue values. The method involves determining a series of digits in a weighted number system based on the RNS residue values.

20 Claims, 7 Drawing Sheets

U.S. PATENT DOCUMENTS

| | | | |
|---|---|---|---|
| 6,023,612 A | 2/2000 | Harris et al. | |
| 6,038,317 A | 3/2000 | Magliveras et al. | |
| 6,078,611 A | 6/2000 | La Rosa et al. | |
| 6,141,786 A | 10/2000 | Cox et al. | |
| 6,304,216 B1 | 10/2001 | Gronemeyer | |
| 6,304,556 B1 | 10/2001 | Haas | |
| 6,314,187 B1 | 11/2001 | Menkhoff et al. | |
| 6,331,974 B1 | 12/2001 | Yang et al. | |
| 6,377,782 B1 | 4/2002 | Bishop et al. | |
| 6,570,909 B1 | 5/2003 | Kansakoski et al. | |
| 6,614,914 B1 | 9/2003 | Rhoads et al. | |
| 6,665,692 B1 | 12/2003 | Nieminen | |
| 6,732,127 B2 * | 5/2004 | Karp | 708/250 |
| 6,744,893 B1 | 6/2004 | Fleming-Dahl | |
| 6,754,251 B1 | 6/2004 | Sriram et al. | |
| 6,766,345 B2 | 7/2004 | Stein et al. | |
| 6,842,479 B2 | 1/2005 | Bottomley | |
| 6,980,656 B1 | 12/2005 | Hinton, Sr. et al. | |
| 6,986,054 B2 | 1/2006 | Kaminaga et al. | |
| 6,993,016 B1 | 1/2006 | Liva et al. | |
| 7,023,323 B1 | 4/2006 | Nysen | |
| 7,027,598 B1 | 4/2006 | Stojancic et al. | |
| 7,069,492 B2 | 6/2006 | Piret et al. | |
| 7,076,065 B2 | 7/2006 | Sherman et al. | |
| 7,078,981 B2 | 7/2006 | Farag | |
| 7,079,651 B2 | 7/2006 | Den Boer et al. | |
| 7,095,778 B2 | 8/2006 | Okubo et al. | |
| 7,133,522 B2 | 11/2006 | Lambert | |
| 7,170,997 B2 | 1/2007 | Petersen et al. | |
| 7,190,681 B1 | 3/2007 | Wu | |
| 7,200,225 B1 | 4/2007 | Schroeppel | |
| 7,233,969 B2 | 6/2007 | Rawlins et al. | |
| 7,233,970 B2 | 6/2007 | North et al. | |
| 7,245,723 B2 | 7/2007 | Hinton, Sr. et al. | |
| 7,269,198 B1 | 9/2007 | Elliott et al. | |
| 7,269,258 B2 | 9/2007 | Ishihara et al. | |
| 7,272,168 B2 | 9/2007 | Akopian | |
| 7,277,540 B1 | 10/2007 | Shiba et al. | |
| 7,529,292 B2 | 5/2009 | Bultan et al. | |
| 7,643,537 B1 | 1/2010 | Giallorenzi et al. | |
| 7,779,060 B2 | 8/2010 | Kocarev et al. | |
| 7,830,214 B2 | 11/2010 | Han et al. | |
| 7,853,014 B2 | 12/2010 | Blakley et al. | |
| 7,974,146 B2 | 7/2011 | Barkley | |
| 2002/0012403 A1 | 1/2002 | McGowan et al. | |
| 2002/0034191 A1 | 3/2002 | Shattil | |
| 2002/0099746 A1 | 7/2002 | Tie et al. | |
| 2002/0174152 A1 * | 11/2002 | Terasawa et al. | 708/250 |
| 2002/0186750 A1 | 12/2002 | Callaway et al. | |
| 2003/0016691 A1 | 1/2003 | Cho | |
| 2003/0044004 A1 | 3/2003 | Blakley et al. | |
| 2004/0001556 A1 | 1/2004 | Harrison et al. | |
| 2004/0059767 A1 | 3/2004 | Liardet | |
| 2004/0092291 A1 | 5/2004 | Legnain et al. | |
| 2004/0146095 A1 | 7/2004 | Umeno et al. | |
| 2004/0156427 A1 | 8/2004 | Gilhousen et al. | |
| 2004/0196212 A1 | 10/2004 | Shimizu | |
| 2005/0031120 A1 | 2/2005 | Samid | |
| 2005/0050121 A1 | 3/2005 | Klein et al. | |
| 2005/0089169 A1 | 4/2005 | Kim et al. | |
| 2005/0207574 A1 | 9/2005 | Pitz et al. | |
| 2005/0259723 A1 | 11/2005 | Blanchard | |
| 2005/0274807 A1 | 12/2005 | Barrus et al. | |
| 2006/0072754 A1 | 4/2006 | Hinton et al. | |
| 2006/0093136 A1 | 5/2006 | Zhang et al. | |
| 2006/0123325 A1 | 6/2006 | Wilson et al. | |
| 2006/0209926 A1 | 9/2006 | Umeno et al. | |
| 2006/0209932 A1 | 9/2006 | Khandekar et al. | |
| 2006/0251250 A1 | 11/2006 | Ruggiero et al. | |
| 2007/0121945 A1 | 5/2007 | Han et al. | |
| 2007/0230701 A1 | 10/2007 | Park et al. | |
| 2008/0008320 A1 | 1/2008 | Hinton et al. | |
| 2008/0016431 A1 | 1/2008 | Lablans | |
| 2008/0095215 A1 | 4/2008 | McDermott et al. | |
| 2008/0198832 A1 | 8/2008 | Chester | |
| 2008/0263119 A1 | 10/2008 | Chester et al. | |
| 2008/0294707 A1 * | 11/2008 | Suzuki et al. | 708/250 |
| 2008/0294710 A1 | 11/2008 | Michaels | |
| 2008/0294956 A1 | 11/2008 | Chester et al. | |
| 2008/0304553 A1 | 12/2008 | Zhao et al. | |
| 2008/0304666 A1 | 12/2008 | Chester et al. | |
| 2008/0307022 A1 | 12/2008 | Michaels et al. | |
| 2008/0307024 A1 | 12/2008 | Michaels et al. | |
| 2009/0034727 A1 | 2/2009 | Chester et al. | |
| 2009/0044080 A1 | 2/2009 | Michaels et al. | |
| 2009/0059882 A1 | 3/2009 | Hwang et al. | |
| 2009/0110197 A1 | 4/2009 | Michaels | |
| 2009/0122926 A1 | 5/2009 | Azenkot et al. | |
| 2009/0196420 A1 | 8/2009 | Chester et al. | |
| 2009/0202067 A1 | 8/2009 | Michaels et al. | |
| 2009/0245327 A1 | 10/2009 | Michaels | |
| 2009/0279688 A1 | 11/2009 | Michaels et al. | |
| 2009/0279690 A1 | 11/2009 | Michaels et al. | |
| 2009/0296860 A1 | 12/2009 | Chester et al. | |
| 2009/0300088 A1 | 12/2009 | Michaels et al. | |
| 2009/0309984 A1 | 12/2009 | Bourgain et al. | |
| 2009/0310650 A1 | 12/2009 | Chester et al. | |
| 2009/0316679 A1 | 12/2009 | Van Der Wateren | |
| 2009/0323766 A1 | 12/2009 | Wang et al. | |
| 2009/0327387 A1 | 12/2009 | Michaels et al. | |
| 2010/0054225 A1 | 3/2010 | Hadef et al. | |
| 2010/0111296 A1 | 5/2010 | Brown et al. | |
| 2010/0254430 A1 | 10/2010 | Lee et al. | |

FOREIGN PATENT DOCUMENTS

| | | |
|---|---|---|
| EP | 0 949 563 | 10/1999 |
| EP | 2 000 900 A2 | 12/2008 |
| EP | 2 000 902 A2 | 12/2008 |
| GB | 1167272 A | 10/1969 |
| JP | 2004279784 A | 10/2004 |
| WO | WO-0135572 A2 | 5/2001 |
| WO | WO-2006 110954 | 10/2006 |
| WO | WO 2008 65191 | 6/2008 |
| WO | WO-2008099367 A2 | 8/2008 |
| WO | WO-2008130973 A1 | 10/2008 |
| WO | WO 2009 146283 | 12/2009 |

OTHER PUBLICATIONS

Barile, Margherita, "Bijective," From MathWorld—A Wolfram Web Resource, created by Eric W. Weisstein. http://mathworld.wolfram.com/Bijective.html, 2002.

Chren, W A: "PN Code Generator with Low Delay-power Product for Spread-Spectrum Communication Systems" IEEE Transactions on Circuits and Systems II: Express Briefs, IEEE Service Center, New York, NY US, vol. 46, No. 12, Dec. 1, 1999, pp. 1506-1511, XP000932002, ISSN: 1057-7130.

De Matteis, A., et al., "Pseudorandom Permutation". Journal of Computational and Applied Mathematics, Elsevier, Netherlands, vol. 142, No. 2, May 15, 2002, pp. 367-375, XP007906923, ISSN: 0377-0427.

Knuth, D E: "The Art of Computer Programming, 3.2.2 Other Methods" The Art of Computer Programming. vol. 2: Seminumerical Algorithms, Boston, MA: Addison-Wesley, US, Jan. 1, 1998, pp. 26-40, XP002409615, ISBN: 978-0-0201-89684-8.

Knuth, D.E., "The Art of Computer Programming, Third Edition; vol. 2 Seminumerical Algorithms". Feb. 2005, Addison-Wesley, Boston 310200, XP002511903, pp. 142-146, 284-292.

Kolumban, et al., "The Role of Synchronization in Digital Communications Using Chaos—Part II: Chaotic Modulation and Chaotic Synchronization", IEEE Transactions on Circuits and Systems Part I: Regular Papers, IEEE Service Center, New York, NY US, vol. 45, No. 11, Nov. 1, 1998, XP011011827, ISSN: 1057-7122.

Kolumban, et al., "Chaotic Communications with Correlator Receivers: Theory and Performance Limits" Proceedings of the IEEE, vol. 90, No. 5, May 2002.

Leung, et al., "Time-varying synchronization of chaotic systems in the presence of system mismatch" Physical Review E (Statistical, Nonlinear, and Soft Matter Physics) APS through AIP USA, [online] Vo. 69, No. 2, Feb. 1, 2004, pp. 26201-1, XP002499416, ISSN: 1063-651X. Retrieved from the Internet: URL:http://prola.aps.org/pdf/PRE/v69/i2/e026201 [retrieved Oct. 13, 2008].

Manikandan, et al, "A Novel Pulse Based Ultrawide Band System Using Chaotic Spreading Sequences" Communication Systems Software and Middleware, 2007. COMSWARE 2007. 2nd International Conference on, IEEE, PI, Jan. 1, 2007, pp. 1-5, XP031113946 ISBN: 978-1-4244-0613-5; p. 1, p. 5.

Morsche et al., "Signals and Systems," lecture notes, University of Eindhoven, The Netherlands (1999).

Panella, et al., "An RNS Architecture for Quasi-Chaotic Oscillators" The Journal of VLSI Signal Processing, Kluwer Academic Publishes, BO, vol. 33, No. 1-2, Jan. 1, 2003, pp. 199-220, XP019216547, ISSN: 1573-109X.

Nakamura, et al, "Chaotic synchronization-based communications using constant envelope pulse" Electrical Engineering in Japan, [Online] vol. 163, No. 3, Feb. 12, 2008, pp. 47-56, XP002539977 Japan. Retrieved from the Internet: URL:http://www3.interscience.wiley.com/cgi-bin/fulltext/117910986/PDFSTART>; [retrieved on Aug. 4, 2009] p. 47-p. 48; p. 50-p. 51.

Pleszczynski, S, "On the Generation of Permutations" Information Processing Letters, Amsterdam, NL, vol. 3, No. 6, Jul. 1, 1975, pp. 180-183, XP008023810, ISSN: 0020-0190.

Pourbigharaz F. et al, Modulo-Free Architecture for Binary to Residue Transformation with Respect to (2m-1, 2m, 2m+1) Moduli Set, IEEE International Symposium on Circuits and Systems, May 30-Jun. 2, 1994, pp. 317-320, vol. 2, London, UK.

Salberg, et al, "Stochastic multipulse-PAM: A subspace modulation technique with diversity" Signal Processing, Elsevier Science Publishers B.V. Amsterdam, NL, vol. 83, No. 12, Dec. 1, 2003, pp. 2559-2577, XP004467986; ISSN: 0165-1684.

Vanwiggeren et al., "Chaotic Communication Using Time-Delayed Optical Systems", International Journal of Bifurcation and Chaos, vol. 9, No. 11 (1999), pp. 2129-2156, World Scientific Publishing Company.

Weisstein, Eric W., "Injection," From MathWorld—A Wolfram Web Resource. http://mathworld.wolfram.com/Injection.html, 2005.

Weisstein, Eric W. "Surjection," From MathWorld—A Wolfram Web Resource, http://mathworld.wolfram.com/Surjection.html, 2002.

Yen, et al., (1999) "Residual Number System Assisted CDMA: A New System Concept", In: ACTS'99, Jun. 8-11, 1999, Sorrento, Italy.

Yu, et al., "A comparative Study of Different Chaos Based Spread Spectrum Communication Systems", ISCAS 2001, Proceedings of the 2001 IEEE International Symposium on Circuits and Systems, Sydney, Australia, May 6-9, 2001; (IEEE International Symposium on Circuits and Systems], New York, NY : IEEE, US, vol. 3, May 6, 2001, pp. 216-216, XP01054114, ISBN: 978-0-7803-6685-5.

Michaels, et al., U.S. Appl. No. 12/496,214, filed Jul. 1, 2009, entitled "Anti-Jam Communications Having Selectively Variable PAPR Including CAZAC Waveform".

Michaels, et al., U.S. Appl. No. 12/507,111, filed Jul. 22, 2009, entitled "Anti-Jam Communications Using Adaptive Chaotic Spread Waveform".

Chester, et al., U.S. Appl. No. 12/480,264, filed Jun. 8, 2009, entitled "Continuous Time Chaos Dithering".

Chester, et al., U.S. Appl. No. 12/481,704, filed Jun. 10, 2009, entitled "Discrete Time Chaos Dithering".

Michaels, et al., U.S. Appl. No. 12/345,163, filed Dec. 29, 2008, entitled "Communications System Employing Chaotic Spreading Codes With Static Offsets".

Micheals, et al., U.S. Appl. No. 12/344,962, filed Dec. 29, 2008, entitled "Communications System Employing Orthogonal Chaotic Spreading Codes".

Michaels, et al., U.S. Appl. No. 12/396,828, filed Jun. 3, 2009, entitled "Communications System Employing Orthogonal Chaotic Spreading Codes".

Michaels, et al., U.S. Appl. No. 12/496,170, filed Jul. 1, 2009, entitled "Permission Based Multiple Access Communications Systems".

Michaels, et al., U.S. Appl. No. 12/496,233, filed Jul. 1, 2009, entitled "Permission-Based Secure Multiple Access Communication Systems Rotations".

Michaels, et al., U.S. Appl. No. 12/507,512, filed Jul. 22, 2009, entitled "Permission-Based TDMA Chaotic Communication Systems".

Micheals, et al., U.S. Appl. No. 12/496,085, filed Jul. 1, 2009, entitled, "High-Speed Cryptographic System Using Chaotic Sequences".

Michaels, et al., U.S. Appl. No. 12/496,123, filed Jul. 1, 2009, entitled, "Rake Receiver for Spread Spectrum Chaotic Communications Systems".

Michaels, et al., U.S. Appl. No. 12/496,146, filed Jul. 1, 2009, entitled "Improved Symbol Estimation for Chaotic Spread Spectrum Signal".

Micheals, et al., U.S. Appl. No. 12/480,316, filed Jul. 8, 2009, entitled "Symbol Duration Dithering for Secured Chaotic Communications".

Michaels, et al., U.S. Appl. No. 12/496,183, filed Jul. 1, 2009, entitled "Bit Error Rate Reduction in Chaotic Communications".

Michaels, Alan, U.S. Appl. No. 12/248,131, filed Oct. 9, 2008, entitled "Ad-Hoc Network Acquisition Using Chaotic Sequence Spread Waveform".

Michaels, Alan, U.S. Appl. No. 12/201,021, filed Aug. 29, 2008, entitled, "Multi-Tier Ad-Hoc Network Communications".

Barda, A; et al., "Chaotic signals for multiple access communications," Electrical and Electronics Engineers in Israel, 1995, Eighteenth Convention of, vol., No., pp. 2.1.3/1-2.1/3/5, Mar. 7-8, 1995.

Alia, G., et al., "A VLSI Algorithm for Direct and Reverse Conversion from Weighted Binary Number System to Residue Number System", IEEE Trans on Circuits and Systems, vol. Cas-31, No. 12, Dec. 1984.

Menezes, Vanstone, Oorschot: "Handbook of Applied Cryptography", 1997, CRC Press LLC, USA, XP002636791, p. 80-p. 85, p. 238-242.

Schneier, Bruce: "Applied Cryptography Second Edition", 1997, John Wiley & Sons, USA, XP002636792, p. 254-p. 255.

International Search Report mailed Jul. 22, 2011, Application Serial No. PCT/US2009/04276; Filing Date May 4, 2009, in the name of Harris Corporation.

Taylor, F.J., "Residue Arithmetic a Tutorial with Examples", Computer, vol. 17, No. 5, pp. 50-62, May 1984, doi: 10.1109/MC. 1984.1659138.

Aparicio; "Communications Systems Based on Chaos" May 2007. Universidad Rey Juan Carlos.

Bererber, S.M., et al., "Design of a CDMA Sysetm in FPGA Technology", Vehicular Technology Conference, 2007. VTC2007-Spring. IEEE 65$^{th}$ Apr. 22, 2007, Apr. 25, 2007), pp. 3061-3065, XP002575053 Dublin ISBN: 1-4244-0266-2 Retrieved from the Internet: URL:http://ieeexplore.ieee.org> [retrieved on Mar. 23, 2010].

Desoky, A.H., et al., "Cryptography Software System Using Galois Field Arithmetic" 2006 IEEE Information Assurance Workshop, West Point, NY, Jun. 12-13, Piscataway, NJ, USA IEEE, Jan. 1, 2006, pp. 386-387, XP031099891.

El-Khamy S E: "New trends in wireless multimedia communications based on chaos and fractals" National Radio Science Conference, 2004. NRSC 2004. Proceedings of the Twenty-First Cairo, Egypt Mar. 16-18, 2004, Piscataway, NJ, USA, IEEE, Mar. 16, 2004, pp. 1-1_1, XP010715117 ISBN: 978-977-5031-77-8.

Lai, X., et al., "A Proposal for a New Block Encryption Standard" Advances in Cryptology-Eurocrypt '90, Workshop on the Theory and Application of Cryptographic Techniques Proceedings, Springer-Verlag Berlin, Germany, 1998, pp. 389-404, XP000617517.

Soobul, Y., et al. "Digital chaotic coding and modulation in CDMA" IEEE AFRICON 2002 Oct. 2, 2002, Oct. 4, 2002, pp. 841-846, XP002575052 Retrieved from the Internet: URL:http://ieeexplore.ieee.org> [retrieved on Mar. 23, 2010].

Rabiner, Lawrence R., "A Tutorial on Hidden Markov Models and Selected Applications in Speech Recognition", Proceedings of the IEEE, vol. 77, No. 2, Feb. 1989.

Boyar, "Inferring Sequences Produce by Pseudo-Random Number Generators", Journal of the Associate for Computing Machine, vol. 36, No. 1, pp. 20-41, 1989.

Barile, M., "Bijective", From MathWorld—A Wolfram Web Resource, created by Eric W. Weisstein, [online] [retrieved on Nov. 8, 2010] Retrieved from the Internet: <http://mathworld.wolfram.com/Bijective.html>.

Weisstein, E., Surjection:, From MathWorld—A Wolfram Web Resource [online] [retrieved on Nov. 8, 2010] Retrieved from the Internet: <http://mathworld.wolfram.com/surjection.html>.

Weisstein, E., Surjection:, From MathWorld—A Wolfram Web Resource [online] [retrieved on Nov. 8, 2010] Retrieved from the Internet: http://mathworld.wolfram.com/injection.html>.

Harris Corp., International Search Report mailed Feb. 11, 2010, Application Serial No. PCT/US2009/059948.

Harris Corp., International Search Report mailed Apr. 13, 2010, Application Serial No. PCT/US2009/0069121.

Harris Corp., International Search Report mailed Apr. 13, 2010, Application Serial No. PCT/US2009/0069118.

Harris Corp., European Search Report mailed Mar. 4, 2010, Patent Application No. 08009745.4.

Deckert, T., et al: "Throughput of WLAN with TDMA and Superimposed Transmission with Resource and Traffic Constraints" Personal, Indoor and Mobile Radio Communications, 2006 IEEE 17th Inter National Symposium on, IEEE, PI, Sep. 1, 2006, pp. 1-5, XP031023581, ISBN: 978-1-4244-0329-5.

Deckert, T., et al: 1-10 "Superposed Signaling Option for Bandwidth Efficient Wireless LANs" Proceedings of the 7th International Symposium on Wireless Personal Multimedia Communications, [Online] Sep. 15, 2004,XPOO2558039.

Socek, D., et al., Short Paper: Enhanced 1-D Chaotic Key Based Algorithm for Image Encryption, Sep. 2005, IEEE.

Abu-Khader, Nabil, Square Root Generator for Galois Field in Multiple-Valued Logic., Recent Patents on Electrical Engineering; Sep. 2011, vol. 4 Issue 3, p. 209-213, 5p, 2 Diagrams, 3 Charts.

Pirkin, Llya, Calculations in Galois Fields., C/C++ Users Journal; Oct. 2004, vol. 22 Issue 10, p. 14-18, 4p, 1 Color Photograph.

Popescu, Angel, A Galois Theory for the Field Extension K ((X))/K., Glasgow Mathematical Journal; Sep. 2010, vol. 52 Issue 3, p. 447-451, 5p.

Pirkin, Ilya, Calculations in Galois Fields., C/C++ Users Journal; Oct. 2004, vol. 22 Issue 10, p. 14-18, 4p, 1 Color Photograph.

Diaz-Toca, G.M. and Lombardi, H., Dynamic Galois Theory., Journal of Symbolic Computation; Dec. 2010, vol. 45 Issue 12, p. 1316-1329, 14p.

Galias, Z., et al., "Quadrature Chaos-Shift Keying: Theory and Performance Analysis", IEEE Transactions on Circuits and Systems Part I: Regular Papers, IEEE Service Center, New York, NY US, vol. 48, No. 12, Dec. 1, 2001 XP011012427; pp. 1510-1514.

International Search Report mailed Dec. 30, 2011, European Patent Application No. 11001222.6, in the name of Harris Corporation.

* cited by examiner

DIGITAL GENERATION OF AN ACCELERATED OR DECELERATED CHAOTIC NUMERICAL SEQUENCE

BACKGROUND OF THE INVENTION

1. Statement of the Technical Field

The invention concerns communications systems employing numerical sequence generation. More particularly, the invention relates to methods for the digital generation of an accelerated and/or decelerated chaotic numerical sequence.

2. Description of the Related Art

Chaotic systems can be thought of as systems which can vary unpredictably due to the defining characteristics: sensitivity to initial conditions; being dense; and being topologically transitive. The characteristics of denseness and topological transitivity mean that the resultant numerical values generated by a chaotic circuit take all possible values without clumping together. When measured or observed, chaotic systems do not reveal any discernible regularity or order. However, despite its "random" appearance, chaos is a deterministic evolution.

There are many types of chaotic communications systems known in the art. Such chaotic communications systems offer promise for being the basis of a next generation of low probability of intercept (LPI) waveforms, low probability of detection (LPD) waveforms, and secure waveforms. While many chaotic communications systems have been developed for generating chaotically modulated waveforms, such chaotic communications systems suffer from low throughput. The term "throughput" as used herein refers to the amount of payload data transmitted over a data link during a specific amount of time.

There are many communications system applications where it is desirable to accelerate and/or decelerate the chaos generation process in an arbitrary manner. Traditionally, the process of generating and satisfactorily synchronizing two or more chaotic numerical sequences simultaneously is extremely cumbersome. The required updating of chaotic state information limits the practical amount of user data throughput. Further, since a chaotic signal has near infinite repetition period, the ability to rapidly synchronize or update the current state to any arbitrary past or future state is desirable. For example, if a first communications device is turned on during a first year, then the first communications device transmits chaotic signals relative to an initial state starting at time zero (t=0). The chaotic signals can be generated by combining a payload data signal with a chaotic spreading signal. In such a scenario, if a second communications device is turned on during a fifth year and is provided for receiving chaotic signals from the first communications device, then it is desirable to immediately synchronize a process for generating the identical chaotic signal for use in deciphering the received signal.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods (and implementing systems) for generating an accelerated and/or decelerated chaotic sequence. The method involves selecting a plurality of polynomial equations that exhibit chaotic properties. Each of the polynomial equations is constructed from an acc-dec variable v. The polynomial equations can be irreducible and/or identical exclusive of a constant value.

The method also involves selecting a value for the acc-dec variable v for advancing or stepping back a chaotic sequence generation by at least one cycle at a given time t. The acc-dec variable v can be defined by a mathematical expression c modulo mi. In the mathematical expression, c is a number of cycles for acceleration or deceleration. $m_i$ is a value indicating a cycle in which a chaotic sequence starts to repeat.

The method further involves using residue number system (RNS) arithmetic operations to respectively determine solutions for the polynomial equations. The solutions are iteratively computed and expressed as RNS residue values. The solutions can be determined using at least one memory based table. The method also includes the step of determining a series of digits in a weighted number system based on the RNS residue values. The series of digits can be determined using at least one memory based table. The method also includes an optional step of a mixed-radix conversion, arithmetic operations, or other combination with a masking sequence (not discussed) to hide the underlying process from unintended deciphering.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The present invention concerns a method for generating an accelerated or decelerated chaotic sequence which can be used in various types of chaos-based communications systems. Such chaos-based communications systems include a chaotic spreading signal based communications system, a coherent chaos shift keying based communications system, a non-coherent chaos shift keying based communications system, and a differential code shift keying (DCSK) based communications system. Such chaotic communications systems also include a chaotic on-off keying based communications system, a frequency-modulated DCSK based communications system, a correlation delay shift keying based communications system, a symmetric code shift keying (CSK) based communications system, and a quadrature CSK based communications system.

It will be appreciated that each of the forgoing chaos based communications systems requires a chaos generator which is capable of producing a chaotic sequence. A chaotic sequence, as that term is used herein, is a signal having a time varying value expressed in analog or digital form that has no discernible regularity of order, yet adheres to the three primary defining characteristics of a chaotic system. Those having ordinary skill in the art will readily appreciate that the chaotic sequence can be used in a variety of ways, depending on the particular type of chaotic communications system which is desired for implementation.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system or a computer program product. Accordingly, the present invention can take the form as an entirely hardware embodiment, an entirely software embodiment or a hardware/software embodiment.

Figure 1:
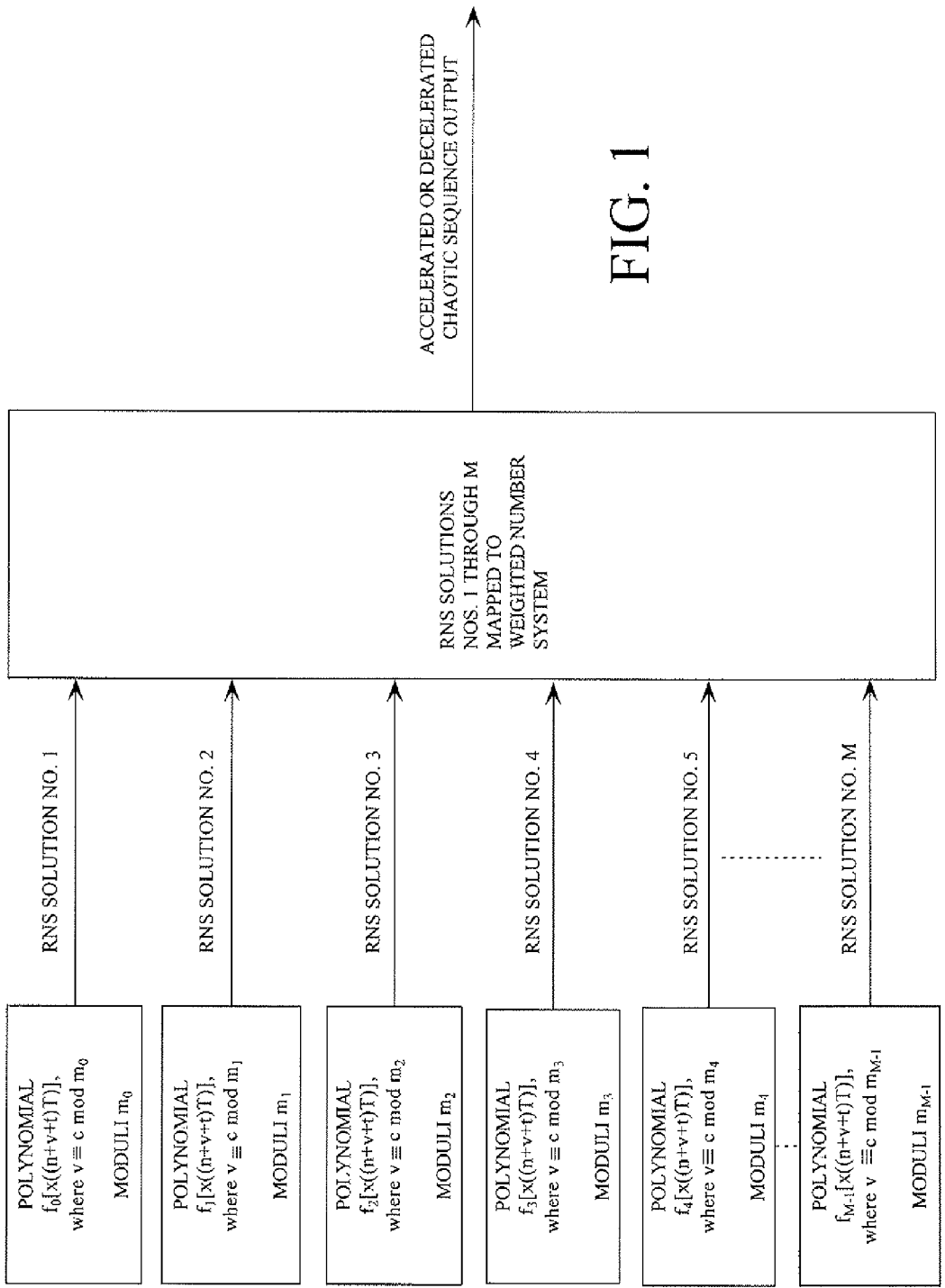
FIG. 1 is a conceptual diagram of an accelerated and/or decelerated chaotic sequence generation that is useful for understanding the present invention.

Referring now to FIG. 1, there is provided a conceptual diagram of a chaotic sequence generator that is useful for understanding the present invention. As shown in FIG. 1, generation of the chaotic sequence begins with M polynomial equations. The M polynomial equations can be selected as polynomial equations $f_0[x((n+v+t)T)], \ldots, f_{M-1}[x((n+v+t)T)]$. n is an index of time used to define the initial state of the polynomial. v is a variable having a value selected to accelerate or decelerate a chaotic sequence generation by at least one cycle. t is a variable representing time. T is a discrete time interval.

According to an embodiment of the invention, v is defined by the mathematical expression c modulo $m_i$, where i belongs to $\{0, 1, 2, \ldots, M\}$. c is a number of cycles for acceleration or deceleration. $m_i$ is a value indicating a cycle in which each of the individual RNS digital chaotic sequence components starts to repeat. It should be noted that such a modular reduction provides a chaotic sequence generation configured to instantaneously synchronize its cycle with a cycle of another chaotic sequence generation when all RNS components are simultaneously synchronized. This feature of the modular reduction will become more apparent as the discussion progresses. It should also be noted that the invention is not limited in this regard.

Referring again to FIG. 1, the M polynomial equations are selected for digitally generating an accelerated or decelerated chaotic sequence. In this regard, it should be appreciated that a chaotic sequence generation process using M polynomial equations $f_0[x((n+v+t)T)], \ldots, f_{M-1}[x((n+v+t)T)]$ can be accelerated or decelerated by one cycle. For example, if the variable v is selected to have a value equal to zero (0) and the initial time t is set to zero (0), then a sequence of values $f_0[x((n)T)], f_1[x((n+1)T)], f_2[x((n+2)T)], f_3[x((n+3)T)], f_4[x((n+4)T)]$ are generated as a function of time during a chaotic sequence generation. Alternatively, if the variable v is selected to have a value equal to positive one (+1) and the chaotic sequence generation is to be accelerated at time two (t=2) for a single cycle, then the sequence of values $f_0[x((n)T)], f_1[x((n+1)T)], f_2[x((n+3)T)], f_3[x((n+4)T)], f_4[x((n+5)T)]$ are generated as a function of time during a chaotic sequence generation. Similarly, if the variable v is selected to have a value equal to negative one (−1) and the chaotic sequence generation is to be decelerated at time two (t=2) for a single cycle, then the sequence of values $f_0[x((n)T)], f_1[x((n+1)T)], f_2[x((n+1)T)], f_3[x((n+2)T)], f_4[x((n+3)T)]$ are generated as a function of time during a chaotic sequence generation.

It should also be appreciated that a chaotic sequence generation process using M polynomial equations $f_0[x((n+v+t)T)], \ldots, f_{M-1}[x((n+v+t)T)]$ can be accelerated or decelerated by an arbitrary number of cycles. For example, if one RNS component of a chaotic sequence generation process is to be accelerated by one million (1,000,000) cycles at time two (t=2) for a single cycle and $m_i$ equals five-hundred eleven (511), then the sequence of values $f_0[x(nT)], f_1[x((n+1)T)], f_2[x((n+1,000,002)T)], f_3[x((n+1,000,003)T)], f_4[x((n+1,000,004)T)]$ are generated as a function of time during a chaotic sequence generation. Using the fact that 1,000,000=1956·511+484 or 1,000,000 mod 511=484, the sequence of values can be re-written as $f_0[x(nT)], f_1[x((n+1)T)], f_2[x((n+484+2)T)], f_3[x((n+484+3)T)], f_4[x((n+484+4)T)]$ or equivalently as $f_0[x(nT)], f_1[x((n+1)T)], f_2[x((n-27+2)T)], f_3[x((n-27+3)T)], f_4[x((n-27+4)T)]$. The invention is not limited in this regard.

Referring again to FIG. 1, the M polynomial equations $f_0[x((n+v+t)T)], \ldots, f_{M-1}[x((n+v+t)T)]$ can be selected as the same polynomial equation or distinct polynomial equations. According to an aspect of the invention, the M polynomial equations are selected as irreducible polynomial equations having chaotic properties in Galois field arithmetic. Such irreducible polynomial equations include, but are not limited to, irreducible cubic polynomial equations and irreducible quadratic polynomial equations. The phrase "irreducible polynomial equation" as used herein refers to a polynomial equation that cannot be expressed as a product of at least two nontrivial polynomial equations over the same Galois field (f). For example, the polynomial equation $f[x((n+v+t)T)]$ is irreducible if there does not exist two (2) non-constant polynomial equations $g[x((n+v+t)T)]$ and $h[x((n+v+t)T)]$ in $x((n+v+t)T)$ with integer coefficients such that $f[x((n+v+t)T)]=g[x((n+v+t)T)]\cdot h[x((n+v+t)T)]$ modulo the Galois field characteristic.

As will be understood by a person skilled in the art, each of the M polynomial equations $f_0[x((n+v+t)T)], \ldots, f_{M-1}[x((n+v+t)T)]$ can be solved independently to obtain a respective solution. Each solution can be expressed as a residue number system (RNS) residue value using RNS arithmetic operations, i.e. modulo operations. Modulo operations are well known to persons having ordinary skill in the art. Thus, such operations will not be described in great detail herein. However, it should be appreciated that an RNS residue representation for some weighted value "a" can be defined by mathematical Equation (1).

$$R = \{a \text{ modulo } m_0, a \text{ modulo } m_1, \ldots, a \text{ modulo } m_{M-1}\} \quad (1)$$

where R is an RNS residue M-tuple value representing a weighted value "a". Further, $R((n+v+t)T)$ can be a representation of the RNS solution of a polynomial equation $f[x((n+v+t)T)]$ defined as $R((n+v+t)T)=\{f_0[x((n+v+t)T)]$ modulo $m_0, f_1[x((n+v+t)T)]$ modulo $m_1, \ldots, f_{M-1}[x((n+v+t)T)]$ modulo $m_{M-1}\}$. $m_0, m_1, \ldots, m_{M-1}$ respectively are the moduli for RNS arithmetic operations applicable to each polynomial equation $f_0[x((n+v+t)T)], \ldots, f_{M-1}[x((n+v+t)T)]$.

From the foregoing, it will be appreciated that the RNS employed for solving each of the polynomial equations $f_0[x((n+v+t)T)], \ldots, f_{M-1}[x((n+v+t)T)]$ respectively has a selected modulus value $m_0, m_1, \ldots, m_{M-1}$. The value chosen for each RNS moduli is preferably selected to be relatively prime numbers $p_0, p_1, \ldots, p_{M-1}$. The phrase "relatively prime numbers" as used herein refers to a collection of natural numbers having no common divisors except one (1). Consequently, each RNS arithmetic operation employed for expressing a solution as an RNS residue value uses a different relatively prime number $p_0, p_1, \ldots, p_{M-1}$ as a moduli $m_0, m_1, \ldots, m_{M-1}$.

Those having ordinary skill in the art will appreciate that the RNS residue value calculated as a solution to each one of the polynomial equations $f_0[x((n+v+t)T)], \ldots, f_{M-1}[x((n+v+t)T)]$ will vary depending on the choice of prime numbers $p_0, p_1, \ldots, p_{M-1}$ selected as a moduli $m_0, m_1, \ldots, m_{M-1}$. Moreover, the range of values will depend on the choice of relatively prime numbers $p_0, p_1, \ldots, p_{M-1}$ selected as a moduli $m_0, m_1, \ldots, m_{M-1}$. For example, if the prime number five hundred three (503) is selected as modulus $m_0$, then an RNS solution for a first polynomial equation $f_0[x((n+v+t)T)]$ will have an integer value between zero (0) and five hundred two (502). Also, the RNS solutions for the first polynomial equation $f_0[x((n+v+t)T)]$ will begin to repeat after 502 cycles. Similarly, if the prime number four hundred ninety-one (491) is selected as modulus $m_1$, then the RNS solution for a second polynomial equation $f_1[x((n+v+t)T)]$ has an integer value between zero (0) and four hundred ninety (490). The RNS solutions for the second polynomial equation $f_1[x((n+v+t)T)]$ will begin to repeat after 490 cycles. The invention is not limited in this regard.

According to an embodiment of the invention, each of the M polynomial equations $f_0[x((n+v+t)T)], \ldots, f_{M-1}[((n+v+t)T)]$ is selected as an irreducible cubic polynomial equation having chaotic properties in Galois field arithmetic. An irreducible cubic polynomial equation can be defined by mathematical Equation (2).

$$f[((n+v+t)T)]=Q(k)x^3((n+v+t)T)+R(k)x^2((n+v+t)T)+S(k)x((n+v+t)T)+C(k,L) \quad (2)$$

where n is a sample time index value used to define the initial state of the polynomial. v is a variable having a value selected to accelerate or decelerate a chaotic sequence generation by at least one cycle. t is a variable representing time. T is a fixed constant having a value representing a time interval or increment. k is a polynomial time index value. The value of k may be obtained from an outside time reference or controlled independent of linear time flow for permitting dynamic control of the irreducible polynomial employed. L is a constant component time index value. Q, R, and S are coefficients that define the polynomial equation $f[x((n+v+t)T)]$. C is a coefficient of $x((n+v+t)T)$ raised to a zero power and is therefore a constant for each polynomial characteristic. In a preferred embodiment, a value of C is selected which empirically is determined to produce an irreducible form of the stated polynomial equation $f[x((n+v+t)T)]$ for a particular prime modulus. For a given polynomial with fixed values for Q, R, and S more than one value of C can exist, each providing a unique iterative sequence. Still, the invention is not limited in this regard.

According to another embodiment of the invention, the M polynomial equations $f_0[x((n+v+t)T)], \ldots, f_{M-1}[((n+v+t)T)]$ are identical exclusive of a constant value C. For example, a first polynomial equation $f_0[x((n+v+t)T)]$ is selected as $f_0[x((n+v+t)T)]=3x^3((n+v+t)T)+3x^2((n+v+t)T)+x((n+v+t)T)+C_0$. A second polynomial equation $f_1[x((n+v+t)T)]$ is selected as $f_1[x((n+v+t)T)]=3x^3((n+v+t)T)+3x^2((n+v+t)T)+x((n+v+t)T)+C_1$. A third polynomial equation $f_2[x((n+v+t)T)]$ is selected as $f_2[x((n+v+t)T)]=3x^3((n+v+t)T)+3x^2((n+v+t)T)+x((n+v+t)T)+C_2$, and so on. Each of the constant values $C_0, C_1, \ldots, C_{M-1}$ is selected to produce an irreducible form in a residue ring of the stated polynomial equation $f[x((n+v+t)T)]=3x^3((n+v+t)T)+3x^2((n+v+t)T)+x((n+v+t)T)+C$. In this regard, it should be appreciated that each of the constant values $C_0, C_1, \ldots, C_{M-1}$ is associated with a particular modulus $m_0, m_1, \ldots, m_{M-1}$ value to be used for RNS arithmetic operations when solving the polynomial equation $f[x((n+v+t)T)]$. An example of such constant values $C_0, C_1, \ldots, C_{M-1}$ and associated modulus $m_0, m_1, \ldots, m_{M-1}$ values which produce an irreducible form of the stated polynomial equation $f[x((n+v+t)T)]=3x^3((n+v+t)T)+3x^2((n+v+t)T)+x((n+v+t)T)+C$ are listed in the following Table (1).

TABLE 1

| Modulus values: | Sets of constant values: |
|---|---|
| 3 | {1, 2} |
| 5 | {1, 3} |
| 11 | {4, 9} |
| 29 | {16, 19} |
| 47 | {26, 31} |
| 59 | {18, 34} |
| 71 | {10, 19, 20, 29} |
| 83 | {22, 26, 75, 79} |
| 101 | {27, 38, 85, 96} |
| 131 | {26, 39, 77, 90} |
| 137 | {50, 117} |
| 149 | {17, 115, 136, 145} |
| 167 | {16, 32, 116, 132} |
| 173 | {72, 139} |
| 197 | {13, 96, 127, 179} |
| 233 | {52, 77} |
| 251 | {39, 100, 147, 243} |
| 257 | {110, 118} |
| 269 | {69, 80} |
| 281 | {95, 248} |
| 293 | {37, 223} |
| 311 | {107, 169} |
| 317 | {15, 55} |
| 347 | {89, 219} |
| 443 | {135, 247, 294, 406} |
| 461 | {240, 323} |
| 467 | {15, 244, 301, 425} |
| 479 | {233, 352} |
| 491 | {202, 234} |
| 503 | {8, 271} |

Still, the invention is not limited in this regard.

The number of discrete magnitude states (dynamic range) that can be generated with the system shown in FIG. 1 will depend on the quantity of polynomial equations M and the modulus values $m_0, m_1, \ldots, m_{M-1}$ selected for the RNS number systems. In particular, this value can be calculated as the product $m_{PROD}=m_0 \cdot m_1 \cdot m_2 \cdot m_3 \cdot \ldots \cdot m_{M-1}$.

Referring again to FIG. 1, it should be appreciated that each of the RNS solutions Nos. 1 through M is expressed in a weighted number system representation. In a preferred embodiment of the invention, each of the RNS solutions Nos. 1 through M is expressed in a binary number system representation. As such, each of the RNS solutions Nos. 1 through M is a binary sequence of bits. Each bit of the sequence has a zero (0) value or a one (1) value. Each binary sequence has a bit length selected in accordance with particular moduli.

According to an embodiment of the invention, each binary sequence representing a residue value has a bit length (BL) defined by a mathematical Equation (3).

$$BL=\text{Ceiling}[\text{Log } 2(m)] \quad (3)$$

where m is selected as one of moduli $m_0, m_1, \ldots, m_{M-1}$. Ceiling[u] refers to a next highest whole integer with respect to an argument u or to u if us is an integer.

In order to better understand the foregoing concepts, an example is useful. In this example, six (6) relatively prime moduli are used to solve six (6) irreducible polynomial equations $f_0[x((n+v+t)T)], \ldots, f_5[x((n+v+t)T)]$. A prime number $p_0$ associated with a first modulus $m_0$ is selected as five hundred three (503). A prime number $p_1$ associated with a second modulus m1 is selected as four hundred ninety one (491). A prime number $p_2$ associated with a third modulus $m_2$ is selected as four hundred seventy-nine (479). A prime number $p_3$ associated with a fourth modulus $m_3$ is selected as four hundred sixty-seven (467). A prime number $p_4$ associated with a fifth modulus $m_4$ is selected as two hundred fifty-seven (257). A prime number $p_5$ associated with a sixth modulus $m_5$ is selected as two hundred fifty-one (251). Possible solutions for $f_0[x((n+v+t)T)]$ are in the range of zero (0) and five hundred two (502) which can be represented in nine (9) binary digits. Possible solutions for $f_1[x((n+v+t)T)]$ are in the range of zero (0) and four hundred ninety (490) which can be represented in nine (9) binary digits. Possible solutions for $f_2[x((n+v+t)T)]$ are in the range of zero (0) and four hundred seventy eight (478) which can be represented in nine (9) binary digits. Possible solutions for $f_3[x((n+v+t)T)]$ are in the range of zero (0) and four hundred sixty six (466) which can be represented in nine (9) binary digits. Possible solutions for $f_4[x((n+v+t)T)]$ are in the range of zero (0) and two hundred fifty six (256) which can be represented in nine (9) binary digits. Possible solutions for $f_5[x((n+v+t)T)]$ are in the range of zero (0) and two hundred fifty (250) which can be represented in eight (8) binary digits.

Arithmetic for calculating the recursive solutions for polynomial equations $f_0[x((n+v+t)T)], \ldots, f_4[x((n+v+t)T)]$ requires nine (9) bit modulo arithmetic operations. The arithmetic for calculating the recursive solutions for polynomial equation $f_5[x((n+v+t)T)]$ requires eight (8) bit modulo arithmetic operations. In aggregate, the recursive results $f_0[x((n+v+t)T)], \ldots, f_5[x((n+v+t)T)]$ represent values in the range from zero (0) to $m_{PROD}-1$. The value of $m_{PROD}$ is calculated as follows: $p_0 \cdot p_1 \cdot p_2 \cdot p_3 \cdot p_4 \cdot p_5 = 503 \cdot 491 \cdot 479 \cdot 467 \cdot 257 \cdot 251 = 3,563,762,191,059,523$. The binary number system representation of each RNS solution can be computed using Ceiling [Log 2(3,563,762,191,059,523)]=Ceiling[51.66]=52 bits. Because each polynomial is irreducible, all 3,563,762,191,059,523 possible values are computed before the sequence repeats resulting in a sequence repetition time of $m_{PROD}$ times T seconds, i.e., a sequence repetition times an interval of time between the computation of each values in the sequence of generated values. Still, the invention is not limited in this regard.

Referring again to FIG. 1, the RNS solutions Nos. 1 through M are mapped to a weighted number system representation thereby forming a chaotic sequence output. The phrase "weighted number system" as used herein refers to a number system other than a residue number system. Such weighted number systems include, but are not limited to, an integer number system, a binary number system, an octal number system, and a hexadecimal number system.

According to an aspect of the invention, the RNS solutions Nos. 1 through M are mapped to a weighted number system representation by determining a series of digits in the weighted number system based on the RNS solutions Nos. 1 through M. The term "digit" as used herein refers to a symbol of a combination of symbols to represent a number. For example, a digit can be a particular bit of a binary sequence. According to another aspect of the invention, the RNS solutions Nos. 1 through M are mapped to a weighted number system representation by identifying a number in the weighted number system that is defined by the RNS solutions Nos. 1 through M. According to yet another aspect of the invention, the RNS solutions Nos. 1 through M are mapped to a weighted number system representation by identifying a truncated portion of a number in the weighted number system that is defined by the RNS solutions Nos. 1 through M. The truncated portion can include any serially arranged set of digits of the number in the weighted number system. The truncated portion can also be exclusive of a most significant digit of the number in the weighted number system. The phrase "truncated portion" as used herein refers to a chaotic sequence with one or more digits removed from its beginning and/or ending. The phrase "truncated portion" also refers to a segment including a defined number of digits extracted from a chaotic sequence. The phrase "truncated portion" also refers to a result of a partial mapping of the RNS solutions Nos. 1 through M to a weighted number system representation.

According to an embodiment of the invention, a mixed-radix conversion method is used for mapping RNS solutions Nos. 1 through M to a weighted number system representation. Mixed-radix conversion is well known to those having ordinary skill in the art, and therefore will not be described herein. The conversion can be modified to yield a truncated result. Still, the invention is not limited in this regard.

According to another embodiment of the invention, a Chinese remainder theorem (CRT) arithmetic operation is used to map the RNS solutions Nos. 1 through M to a weighted number system representation. The CRT arithmetic operation is well known to those having ordinary skill in the art, and therefore will not be described here in detail. Still, the invention is not limited in this regard.

As should be appreciated, the accelerated or decelerated chaotic sequence output Y can be expressed in a binary number system representation. As such, the chaotic sequence output Y can be represented as a binary sequence. Each bit of the binary sequence has a zero (0) value or a one (1) value. The chaotic sequence output Y can have a maximum bit length (MBL) defined by a mathematical Equation (4).

$$MBL=\text{Ceiling}[\text{Log } 2(m_{PROD})] \quad (4)$$

where $m_{PROD}$ is the product of the relatively prime numbers $p_0, p_1, \ldots, p_{M-1}$ selected as moduli $m_0, m_1, \ldots, m_{M-1}$. In this regard, it should be appreciated the $m_{PROD}$ represents a dynamic range of a CRT arithmetic operation. The phrase "dynamic range" as used herein refers to a maximum possible range of outcome values of a CRT arithmetic operation. It should also be appreciated that the CRT arithmetic operation generates a chaotic numerical sequence with a periodicity equal to the inverse of the dynamic range $m_{PROD}$. The dynamic range requires a Ceiling[Log 2($m_{PROD}$)] bit precision.

According to an embodiment of the invention, $m_{PROD}$ equals three quadrillion five hundred sixty-three trillion seven hundred sixty-two billion one hundred ninety-one million fifty-nine thousand five hundred twenty-three (3,563,762,191,059,523). By substituting the value of $m_{PROD}$ into Equation (6), the bit length (BL) for a chaotic sequence output Y expressed in a binary system representation can be calculated as follows: BL=Ceiling[Log 2(3,563,762,191,059,523)=52 bits. As such, the chaotic sequence output Y is a fifty-two (52) bit binary sequence having an integer value between zero (0) and three quadrillion five hundred sixty-three trillion seven hundred sixty-two billion one hundred ninety-one million fifty-nine thousand five hundred twenty-two (3,563,762,191,059,522), inclusive. Still, the invention is not limited in this regard. For example, the chaotic sequence output Y can be a binary sequence representing a truncated portion of a value between zero (0) and $m_{PROD}-1$. In such a scenario, the chaotic sequence output Y can have a bit length less than Ceiling[Log 2($m_{PROD}$)]. It should be noted that while truncation affects the dynamic range of the system it has no effect on the periodicity of a generated sequence.

As should be appreciated, the above-described chaotic sequence generation can be iteratively performed. In such a scenario, a feedback mechanism (e.g., a feedback loop) can be provided so that a variable "x" of a polynomial equation can be selectively defined as a solution computed in a previous iteration. Mathematical equation (2) can be rewritten in a general iterative form: $f[x((n+v+t)T)]=Q(k)x^3[((n+v+t)-1)T]+R(k)x^2[((n+v+t)-1)T]+S(k)x[((n+v+t)-1)T]+C(k,L)$. For example, a fixed coefficient polynomial equation is selected as $f[x((n+v+t)\cdot 1 \text{ ms})]=3x^3[((n+v+t)-1)\cdot 1 \text{ ms}]+3x^2[((n+v+t)-1)\cdot 1 \text{ ms}]+x[((n+v+t)-1)\cdot 1 \text{ ms}]+8 \text{ modulo } 503$. n is a variable having a value defined by an iteration being performed. x is a variable having a value allowable in a residue ring. v is a variable having a value selected to accelerate or decelerate a chaotic sequence generation by at least one cycle. t is a variable representing time. In a first iteration, n equals one (1). v equals zero so that the chaotic sequence generation is not accelerated or decelerated by a predefined number of cycles. t equals zero. x is selected as two (2) which is allowable in a residue ring. By substituting the value of n, v, t, and x into the stated polynomial equation $f[x((n+v+t)T)]$, a first solution having a value forty-six (46) is obtained. In a second iteration, n is incremented by one. x equals the value of the first solution, i.e., forty-six (46) resulting in the solution 298, 410 mod 503 or one hundred thirty-one (131). In a third iteration, n is again incremented by one. x equals the value of the second solution.

Figure 2:
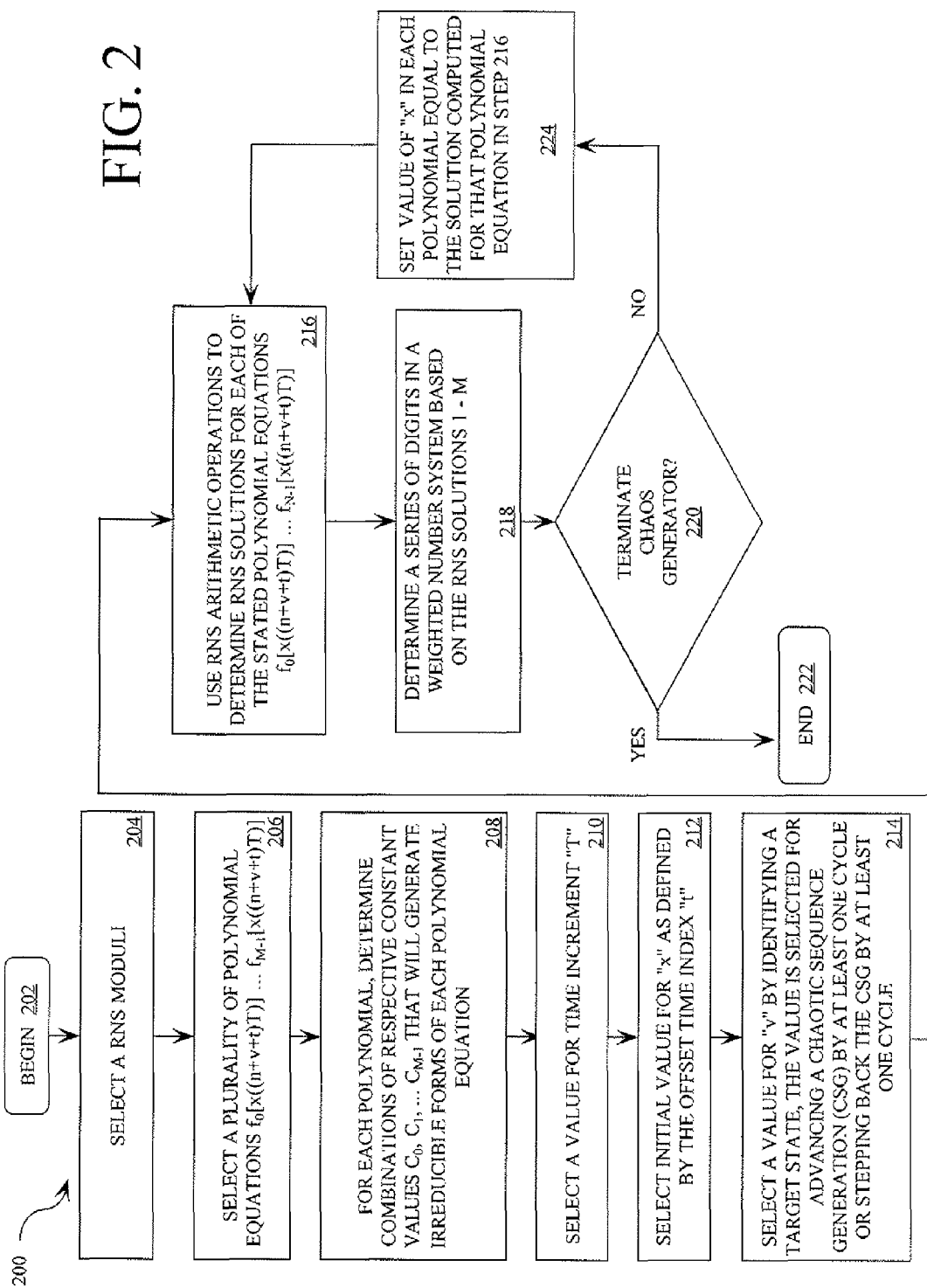
FIG. 2 is a flow diagram of a method for generating an accelerated or decelerated chaotic sequence.

Referring now to FIG. 2, there is provided a flow diagram of a method 200 for generating an accelerated or decelerated chaotic sequence that is useful for understanding the invention. As shown in FIG. 2, the method 200 begins with step 202 and continues with step 204. In step 204, a plurality of RNS moduli $m_0, m_1, \ldots, m_{M-1}$ are selected for use in the arithmetic operations of polynomial equations $f_0[x((n+v+t)T)], \ldots, f_{M-1}[x((n+v+t)T)]$. After step 204 step 206 is performed where polynomial equations $f_0[x((n+v+t)T)], \ldots, f_{M-1}[x((n+v+t)T)]$ are selected. In this regard, it should be appreciated that the polynomial equations $f_0[x((n+v+t)T)], \ldots, f_{M-1}[x((n+v+t)T)]$ can be selected as the same polynomial equation except for a different constant term or different polynomial equations. After step 206, step 208 is performed where a determination for each polynomial equation $f_0[x((n+v+t)T)], \ldots, f_{M-1}[x((n+v+t)T)]$ is made as to which combinations of respective constant values $C_0, C_1, \ldots, C_{M-1}$ generate irreducible forms of each polynomial equation $f_0[x((n+v+t)T)], \ldots, f_{M-1}[x((n+v+t)T)]$.

After step 208, the method 200 continues with step 210. In step 210, a value for time increment "T" is selected. Thereafter, an initial value for "x" is selected in step 212. The initial value for "x" is defined by an offset time index "t". In this regard, it should be appreciated that the initial value for "x" can be any value allowable in a residue ring. Subsequently, step 214 is performed where a value for the variable "v" is selected by identifying a target state. There are a variety of ways to identify a target state. For example, a particular target state may be selected by determining a state of a first chaotic sequence generation for synchronizing a second chaotic sequence generation with the first chaotic sequence generation. The term "state" as used herein refers to a particular cycle of a chaotic sequence generation. The invention is not limited in this regard.

Step 214 can also involve selecting the variable "v" to have a value suitable for advancing a chaotic sequence generation by at least one cycle or stepping back a chaotic sequence generation by at least one cycle during the evolution of the sequence. As noted above, the variable "v" can be defined by the mathematical expression c modulo P for advancing a chaotic sequence generation by an arbitrary number of states (or cycles) or stepping back a chaotic sequence generation by an arbitrary number of states (or cycles). c is a variable representing the target state (or target cycle) of a chaotic sequence generation. For example, if a target state (or cycle) c is determined to be one million (1,000,000) and P equals 511 time indices, then the variable "v" can be computed as follows: v=c modulo P=1,000,000 modulo 511=484. In such a scenario, the full rotations of a ring of size P=511 are eliminated. The remainder having a value of 484 represents a partial (or residue) rotation of the ring or time difference. The invention is not limited in this regard.

Step 214 can further involve selecting the variable "v" as a function of the incremented index "n" (v[n]), such that the advancing of the chaotic sequence may only occur on one or more cycles during the evolution of the sequence. In this manner, the sequence may begin at index n=0, yet be programmed to "jump" v[n=2]=32 cycles at a specified increment index in the future and zero at other times, i.e., v[n=0]=0, v[n=1]=0, v[n=2]=32, v[n=3]=0, v[n=4]=0, and v[n>4]=0.

After selecting a value for the variable "v", the method 200 continues with step 216. In step 216, RNS arithmetic operations are used to iteratively determine RNS solutions for each of the stated polynomial equations $f_0[x((n+v+t)T)], \ldots, f_{M-1}[x((n+v+t)T)]$. In step 218, a series of digits in a weighted number system are determined based on the RNS solutions. This step can involve performing a mixed radix arithmetic operation or a CRT arithmetic operation using the RNS solutions to obtain a chaotic sequence output.

After step 218, the method 200 continues with a decision step 220. If a chaos generator is not terminated (220:NO), then step 224 is performed where a value of "x" in each polynomial equation $f_0[x((n+v+t)T)], \ldots, f_{M-1}[x((n+v+t)T)]$ is set equal to the RNS solution computed for the respective polynomial equation $f_0[x((n+v+t)T)], \ldots, f_{M-1}[x((n+v+t)T)]$ in step 216. Subsequently, the method 200 returns to step 216. If the chaos generator is terminated (2202:YES), then step 222 is performed where the method 200 ends.

Figure 3:
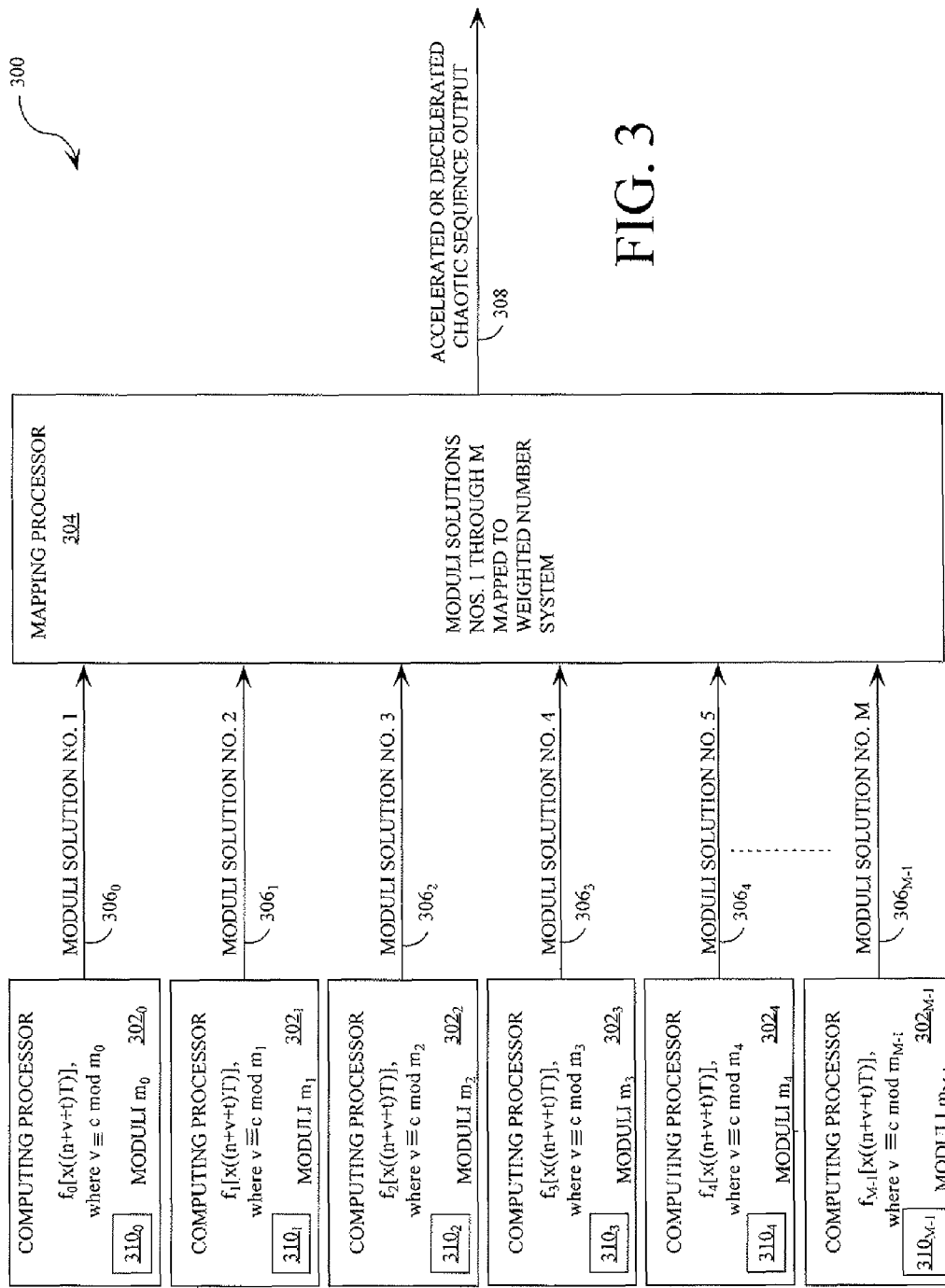
FIG. 3 is a block diagram of a chaotic sequence generator configured to generate an accelerated and/or decelerated numerical sequence.

Referring now to FIG. 3, there is illustrated one embodiment of a chaotic sequence generator (CSG) 300 which could be used to implement the inventive arrangements. The CSG 300 is configured to generate a digital accelerated and/or decelerated chaotic sequence. In this regard, it should be appreciated that the CSG 300 is comprised of computing processors (CPs) $302_0\text{-}302_{M-1}$. The CSG 300 is also comprised of a mapping processor (MP) 304. Each of the CPs $302_0\text{-}302_{M-1}$ is coupled to the MP 304 by a respective data bus $306_0\text{-}306_{M-1}$. As such, each of the CPs $302_0\text{-}302_{M-1}$ is configured to communicate data to the MP 304 via a respective data bus $306_0\text{-}306_{M-1}$. The MP 304 can be coupled to an external device (not shown) via a data bus 308. In this regard, it should be appreciated that the external device (not shown) includes, but is not limited to, a cryptographic device configured to combine or modify a signal in accordance with a chaotic sequence output.

Referring again to FIG. 3, the CPs $302_0\text{-}302_{M-1}$ are comprised of hardware and/or software configured to solve M polynomial equations $f_0[x((n+v+t)T)], \ldots, f_{M-1}[x((n+v+t)T)]$ to obtain a plurality of solutions. The M polynomial equations $f_0[x((n+v+t)T)], \ldots, f_{M-1}[x((n+v+t)T)]$ can be irreducible polynomial equations having chaotic properties in finite field arithmetic. Such irreducible polynomial equations include, but are not limited to, irreducible cubic polynomial equations and irreducible quadratic polynomial equations. The M polynomial equations $f_0[x((n+v+t)T)], \ldots, f_{M-1}[x((n+v+t)T)]$ can also be identical exclusive of a constant value. The constant value can be selected so that a polynomial equation $f_0[x((n+v+t)T)], \ldots, f_{M-1}[x((n+v+t)T)]$ is irreducible for a predefined modulus. The variable "v" can be selected so that a chaotic sequence generation is advanced or stepped back by at least one state (or cycle).

As noted above, the variable "v" can also be selected so that a chaotic sequence generation is advanced or stepped back by an arbitrary number of states (or cycles) at any specific time index in the sequence evaluation. In such a scenario, the variable "v" can be defined by the mathematical expression c modulo P, where c is a variable representing the target state (or target cycle) of a chaotic sequence generation. The CPs $302_0$-$302_{M-1}$ can be comprised of hardware and/or software configured to determine the target state (or target cycle) of a chaotic sequence generation performed by a chaotic sequence generator of an external device (such as a transmitter of a communications device and a cryptographic device).

According to an embodiment of the invention, the target state (or cycle) determination is provided using state (or cycle) information obtained from the external device (such as a transmitter of a communications device and a cryptographic device). Such state (or cycle) information can include, but is not limited to, information identifying a current state (or cycle) of a chaotic sequence generation that is the same or substantially similar to the chaotic sequence generation performed by the CSG 300. The invention is not limited in this regard. For example, the target state (or cycle) determination can alternatively be performed using clock drift information.

Each of the solutions can be expressed as a unique residue number system (RNS) M-tuple representation. In this regard, it should be appreciated that the CPs $302_0$-$302_{N-1}$ employ modulo operations to calculate a respective solution for each polynomial equation $f_0[x((n+v+t)T)], \ldots, f_{M-1}[x((n+v+t)T)]$ using modulo based arithmetic operations. Each of the CPs $302_0$-$302_{M-1}$ is comprised of hardware and/or software configured to utilize a different relatively prime number $p_0$, $p_1, \ldots, p_{M-1}$ as a moduli $m_0, m_1, \ldots, m_{M-1}$ for modulo based arithmetic operations. The CPs $302_0$-$302_{M-1}$ are also comprised of hardware and/or software configured to utilize modulus $m_0, m_1, \ldots, m_{M-1}$ selected for each polynomial equation $f_0[x((n+v+t)T)], \ldots, f_{M-1}[x((n+v+t)T)]$ so that each polynomial equation $f_0[x((n+v+t)T)], \ldots, f_{M-1}[x((n+v+t)T)]$ is irreducible.

The CPs $302_0$-$302_{M-1}$ are further comprised of hardware and/or software configured to utilize moduli $m_0, m_1, \ldots, m_{M-1}$ selected for each polynomial equation $f_0[x((n+v+t)T)], \ldots, f_{M-1}[x((n+v+t)T)]$ so that solutions iteratively computed via a feedback mechanism $310_0$-$310_{M-1}$ are chaotic. In this regard, it should be appreciated that the feedback mechanisms (FMs) $310_0$-$310_{M-1}$ are provided so that the solutions for each polynomial equation $f_0[x((n+v+t)T)], \ldots, f_{M-1}[x((n+v+t)T)]$ can be iteratively computed. Accordingly, the FMs $310_0$-$310_{M-1}$ are comprised of hardware and/or software configured to selectively define a variable "x" of a polynomial equation as a solution computed in a previous iteration.

Referring again to FIG. 3, the CPs $302_0$-$302_{M-1}$ are configured to express each of the RNS residue values in a weighted number system representation. Such methods of representing the results both intermediate and final of modular arithmetic are generally known to persons having ordinary skill in the art, and therefore will not be described in great detail herein. However, it should be appreciated that any such method can be used without limitation. It should also be appreciated that the residue values expressed in weighted number system representations are hereinafter referred to as moduli solutions Nos. 1 through M comprising the elements of an RNS M-tuple.

Referring again to FIG. 3, the MP 304 is configured to map the moduli (RNS M-tuple) solutions Nos. 1 through M to a weighted number system representation. The result is a series of digits in the weighted number system based on the moduli solutions Nos. 1 through M. For example, the MP 304 can be configured to determine the series of digits in the weighted number system based on the RNS residue values using a Chinese Remainder Theorem process. In this regard, it will be appreciated by those skilled in the art that the MP 304 is configured to identify a number in the weighted number system that is defined by the moduli solutions Nos. 1 through M.

According to an aspect of the invention, the MP 304 can be configured to identify a truncated portion of a number in the weighted number system that is defined by the moduli solutions Nos. 1 through M. For example, the MP 304 can also be configured to select the truncated portion to include any serially arranged set of digits of the number in the weighted number system. Further, the MP 304 can be configured to select the truncated portion to be exclusive of a most significant digit when all possible weighted numbers represented by X bits are not mapped, i.e., when $m_{PROD} < 2^X$. X is a fewest number of bits required to achieve a binary representation of the weighted numbers. Still, the invention is not limited in this regard.

Referring again to FIG. 3, the MP 304 is configured to express a chaotic sequence in a binary number system representation. In this regard, it should be appreciated that the MP 304 can employ a non-binary-weighted-to-binary-weighted conversion method. Such methods are generally known to persons skilled in the art and therefore will not be described in great detail herein. However, it should be appreciated that any such method can be used without limitation.

Figure 4A:
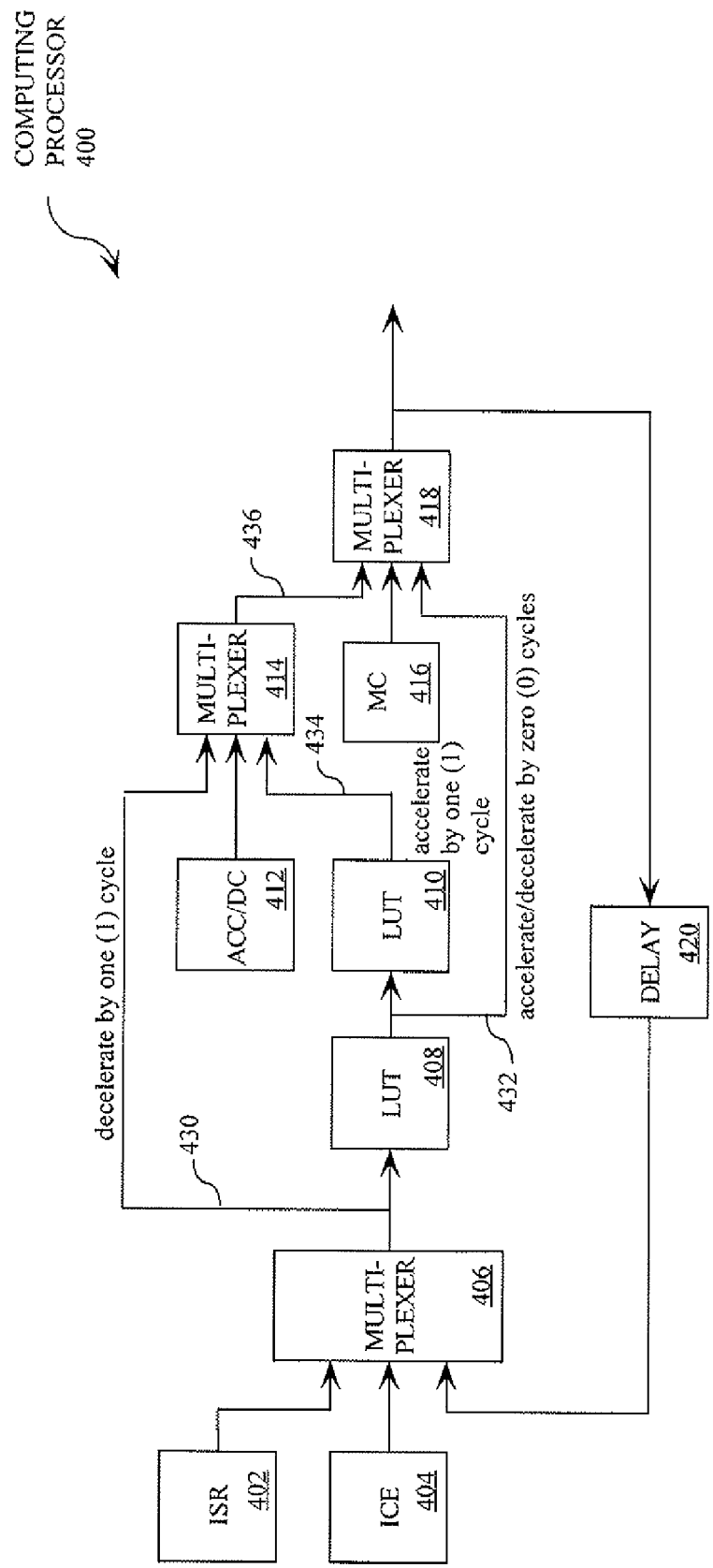
FIGS. 4A-4B collectively provide a block diagram of a chaotic sequence generator implanting memory based tables for generating a numerical sequence that is accelerated and/or decelerated by at least one cycle.

Referring now to FIG. 4A, there is provided a block diagram of a computing processor (CP) implementing memory based tables for generating a numerical sequence that is accelerated and/or decelerated by one (1) cycle. As shown in FIG. 4A, the CP 400 is comprised of an initial state register (ISR) 402, an initial condition enable (ICE) 404, multiplexers 406, 414, 418, look-up table (LUT) devices 408, 410, a unit delay 420, an accelerate/decelerate multiplexer controller (MC) 412, and a multiplexer controller (MC) 416. Each of the listed components is well known to those having ordinary skill in the art, and therefore will not be described herein. However, a brief discussion of the CP 400 is provided to assist a reader in understanding the present invention.

Referring again to FIG. 4A, the ISR 402 is comprised of hardware and software configured to store a set of initial conditions. The ISR 402 is also comprised of hardware and software configured to communicate a set of initial conditions to the multiplexer 406. Initial conditions are well known to those having ordinary skill in the art, and therefore will not be described herein. However, it should be appreciated that an initial condition can be any integer value within the dynamic range of the CPs. The invention is not limited in this regard.

The ICE 404 is comprised of hardware and software configured to control the multiplexer 406. In this regard, it should be appreciated that the ICE 404 can generate a high voltage control signal and a low voltage control signal. The ICE 404 can also communicate control signals to the multiplexer 406. The multiplexer 406 can select an input in response to a control signal received from the ICE 404. For example, if the ICE 404 communicates a high control signal to the multiplexer 406, then the multiplexer 406 can create a path between the ISR 402 and the LUT device 408. However, if the ICE 404 communicates a low control signal to the multiplexer 406, then the multiplexer 406 can create a path between the unit delay 420 and the LUT device 408. The invention is not limited in this regard.

The LUT device 408 is configured to receive inputs from the ISR 402 or the unit delay 420 via the multiplexer 406. The LUT device 408 is also configured to perform look-up table operations using the received inputs. Look-up table operations are well known to those having ordinary skill in the art, and therefore will not be described herein. However, it should be understood that the LUT device 408 is comprised of a memory based table (not shown) containing pre-computed residue values in a binary number system representation. The address space of the memory table (not shown) is at least from zero (0) to $m_M$ for all modulus m, $m_0$ through $m_{M-1}$. On each iteration, a table address is determined using the input received from the ISR 402 or the unit delay 420. The table address is used to select a pre-computed residue value stored at the table address of the memory based table (not shown). Once a pre-computed residue value is selected, the LUT device 408 communicates the same to the LUT device 410 and the multiplexer 418.

The LUT device 410 is configured to receive inputs from the LUT device 408. The LUT device 410 is also configured to perform look-up table operations using the received inputs. In this regard, it should be understood that the LUT device 410 is comprised of a memory based table (not shown) containing pre-computed residue values in a binary number system representation. The address space of the memory table (not shown) is at least from zero (0) to $m_M$ for all modulus m, $m_0$ through $m_{M-1}$. On each iteration, a table address is determined using the input received from the LUT device 408. The table address is used to select a pre-computed residue value stored at the table address of the memory based table (not shown). Once a pre-computed residue value is selected, the LUT device 410 communicates the same to the multiplexer 414.

The accelerate/decelerate MC 412 is configured to control the multiplexer 414. In this regard, it should be appreciated that the accelerate/decelerate MC 412 can generate a high voltage control signal and a low voltage control signal. The accelerate/decelerate MC 412 can also communicate control signals to the multiplexer 414. The multiplexer 414 can select an input in response to a control signal received from the accelerate/decelerate MC 412. For example, if the accelerate/decelerate MC 412 communicates a high control signal to the multiplexer 414, then the multiplexer 414 can create a path 430 between the multiplexer 406 and the multiplexer 418. However, if the accelerate/decelerate MC 412 communicates a low control signal to the multiplexer 414, then the multiplexer 414 can create a path 434 between the LUT 410 and the multiplexer 418. The invention is not limited in this regard. However, it should be noted that the communications path 430 is provided for decelerating a chaotic sequence by one (1) cycle at a particular time t (e.g., t=2). Similarly, the communications path 434 is provided for accelerating a chaotic sequence by one (1) cycle at a particular time t (e.g., t=2).

The MC 416 is configured to control the multiplexer 418. In this regard, it should be appreciated that the MC 416 can generate a high voltage control signal and a low voltage control signal. The MC 416 can also communicate control signals to the multiplexer 418. The multiplexer 418 can select an input in response to a control signal received from the MC 416. For example, if the MC 416 communicates a high control signal to the multiplexer 418, then the multiplexer 418 can create a path 436 between the multiplexer 414 and unit delay 420. However, if the MC 416 communicates a low control signal to the multiplexer 418, then the multiplexer 418 can create a path 432 between the LUT 408 and unit delay 420. The invention is not limited in this regard. However, it should be noted that the communications path 436 is provided for decelerating or accelerating a chaotic sequence by one (1) cycle. Similarly, the communications path 432 is provided for selecting a pre-computed residue value from the LUT 408, i.e., the chaotic sequence is not accelerated or decelerated at a particular time t (e.g., t=1).

The unit delay 420 and LUT devices 408, 410 provide feedback mechanisms for iterated computations of irreducible polynomial equations $f_0[x((n+v+t)T)], \ldots, f_{M-1}[x((n+v+t)T)]$ modulo $m_0, m_1, \ldots, m_{M-1}$. In this regard, it should be understood that the LUT devices 408, 410 are comprised of hardware and software configured to perform lookup table operations for computing irreducible polynomial equations $f_0[x((n+v+t)T)], \ldots, f_{M-1}[x((n+v+t)T)]$ modulo $m_0, m_1, \ldots, m_{M-1}$.

The following discussion is provided for purposes of explaining what happens after an initial condition has been communicated to the CP 400 and how the CP 400 generates a continuous output. If the ISR 402 stores an initial value of forty-two (42) selected by the ICE 404 during the first cycle, then the initial input to the LUT 408 creates an LUT 408 output that is the polynomial evaluation of the initial condition value. The initial input to the LUT 408 represents the previous RNS result. The LUT 408 output is provided as an input to the LUT 410 in order to compute the polynomial function evaluation (PFE) of the LUT 408 output. The PFE of the LUT 408 output is equivalent to one (1) time value into the future. The two (2) select controls 412, 416 select between the computed LUT 408 output, an output of the multiplexer 406, and an output of the LUT 410. The outputs of the components 406, 410 represent the decelerated or accelerated sequence values within the RNS. For example, if the select control 416 continuously selects the output of the LUT 408, then the ICE 404 (during a successive cycle) continuously selects the output of the unit delay 420 to be input to the LUT 408. Over time, the select controls 412, 216 may be manipulated to accelerate or decelerate the sequence of evolution by one (1) per cycle.

Figure 4B:
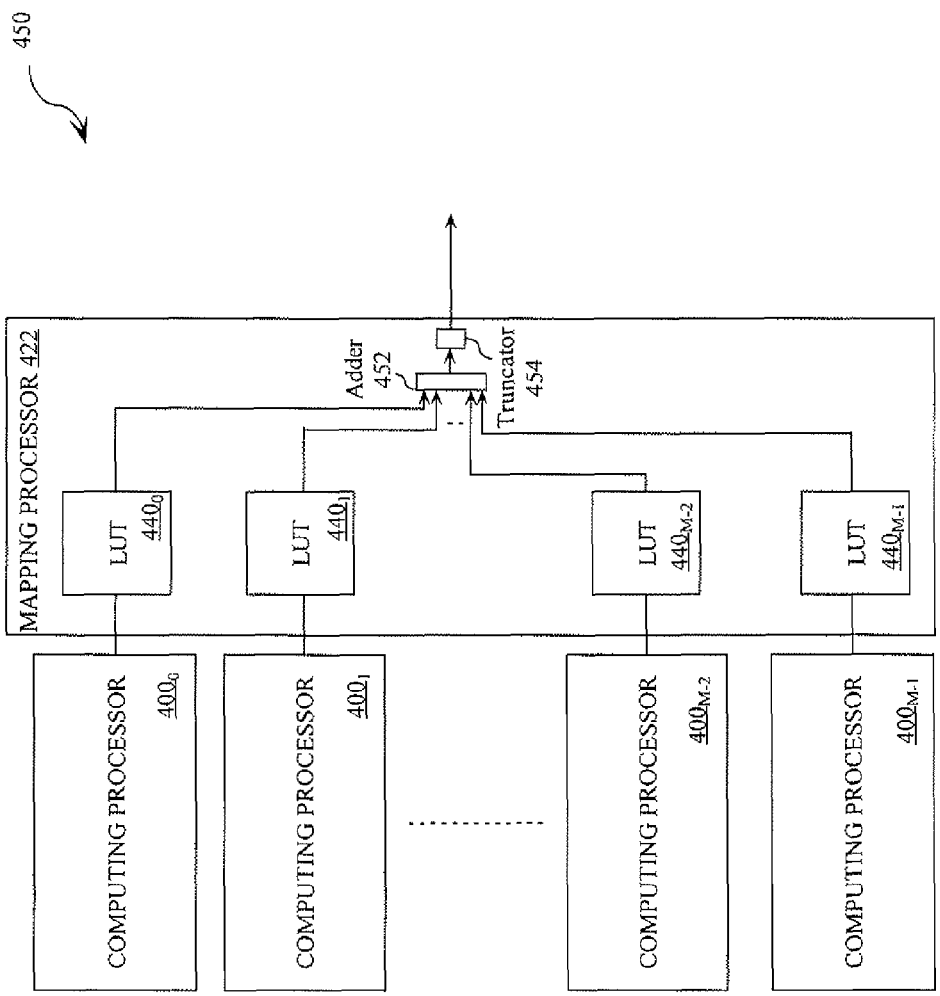

Referring now to FIG. 4B, one or more CPs 400 can be implemented in a chaotic sequence generator (CSG) 450. As shown in FIG. 4B, the CSG 450 is comprised of computing processors CPs $400_0, \ldots, 400_{M-1}$ and a mapping processor 422. The mapping processor 422 is comprised of look-up tables $440_0, \ldots, 440_{M-1}$, an adder 452, and a truncator 454. Each of the listed components $440_0, \ldots, 440_{M-1}$, 452, 454 are well known to persons having ordinary skill in the art, and therefore will not be described in great detail herein. However, a brief description of the listed components $440_0, \ldots, 440_{M-1}$, 452, 454 is provided to assist a reader in understanding the present invention.

Referring again to FIG. 4B, each of the CPs $400_0, \ldots, 400_{M-1}$ is coupled to a respective LUT $440_0, \ldots, 440_{M-1}$. The CPs $400_0, \ldots, 400_{M-1}$ are configured to communicate outputs to the mapping processor 422. More particularly, the CPs $400_0, \ldots, 400_{M-1}$ communicate the outputs to a respect LUT $440_0, \ldots, 440_{M-1}$. The LUTs $440_0, \ldots, 440_{M-1}$ are configured to perform lookup table operations for mapping the outputs into a desired weighted number system. The LUTs $440_0, \ldots, 440_{M-1}$ are also configured to communicate outputs expressed in a weighted number system representation to the adder 452.

The adder 452 is configured to receive outputs expressed in a weighted number system representation from each of the LUTs $440_0, \ldots, 440_{M-1}$. The adder 452 is also comprised of hardware and software configured to perform an addition operation. The addition operation can generally involve combining the results expressed in a weighted number system representation to form a single output. The adder 452 is also configured to communicate the single output to the truncator 454. The truncator 454 is configured to identify a truncated portion of a number in the weighted number system that is defined by the single output of the adder 452. The truncator 454 is also configured to communicate a truncated result to an external device (not shown).

Figure 5A:
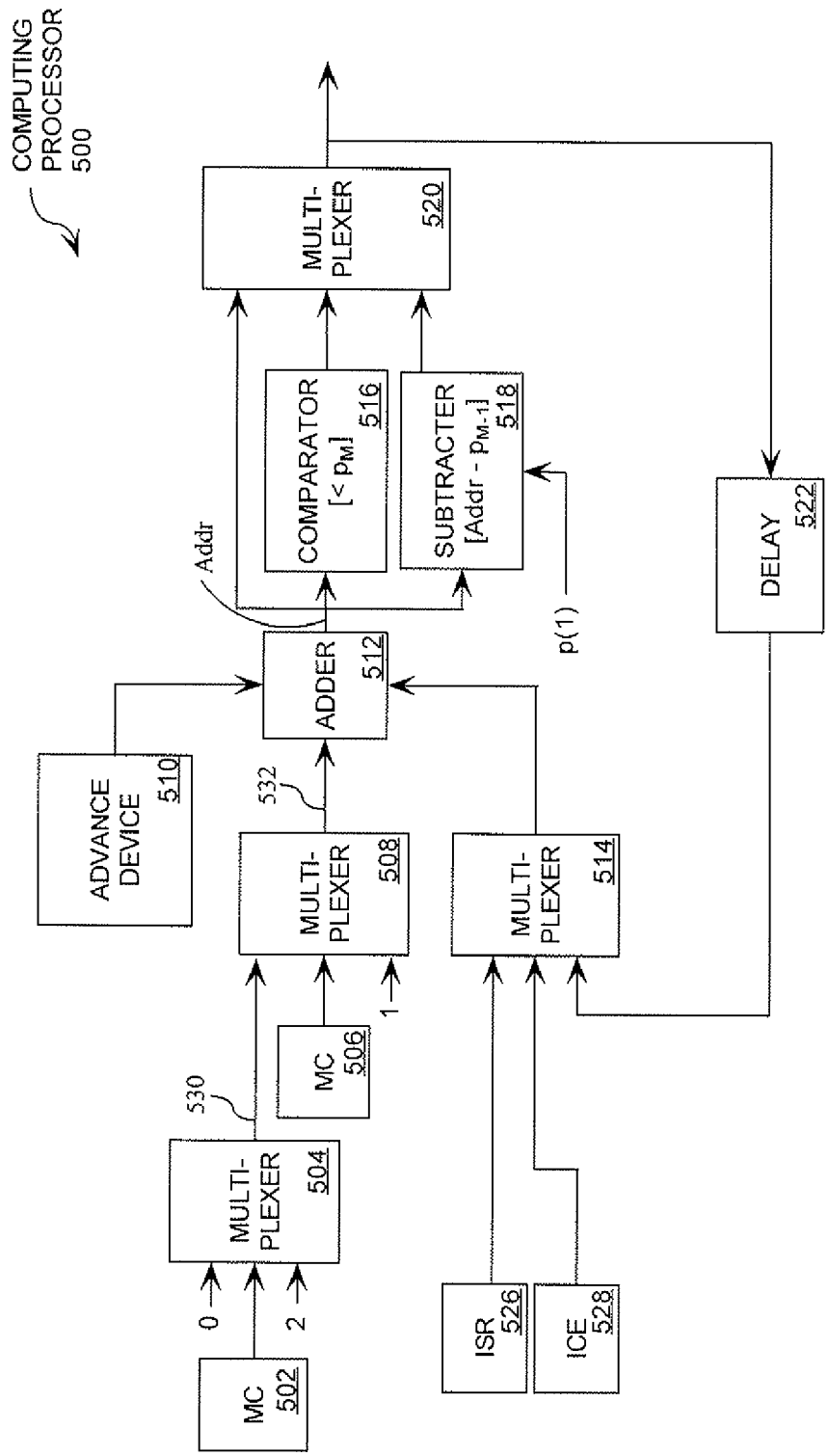
FIGS. 5A-5B collectively provide a block diagram of a chaotic sequence generator configured to instantaneously synchronize its cycle with a cycle of another chaotic sequence generation process.

Referring now to FIG. 5A, there is provided a block diagram of a computing processor (CP) for generating a numerical sequence that is accelerated and/or decelerated by an arbitrary number of cycles at a particular time t (e.g., t=2). As shown in FIG. 5A, the CP 500 is comprised of an initial state register (ISR) 526, an initial condition enable (ICE) 528, multiplexers 504, 508, 514, 520, multiplexer controllers (MCs) 502, 506, an adder 512, an advance device 510, a unit delay 522, a comparator 516, and a subtracter 518. Each of the listed components 502, . . . , 522 is well known to those having ordinary skill in the art, and therefore will not be described herein. However, a brief discussion of the CP 500 is provided to assist a reader in understanding the present invention.

Referring again to FIG. 5A, the ISR 526, ICE 528, and multiplexer 514 collectively provide a key/initial condition insertion device. In this regard, it should be understood that the ISR 526 is configured to store a set of initial conditions. The ISR 526 is also configured to communicate a set of initial conditions to the multiplexer 514. Initial conditions are well known to those having ordinary skill in the art, and therefore will not be described herein. However, it should be appreciated that an initial condition is an integer value. For example, if an initial value of a chaotic sequence is stored in a look up table address of zero (0), then the initial condition is an integer value equal to zero (0). The invention is not limited in this regard.

The ICE 528 is comprised of hardware and software configured to control the multiplexer 514. In this regard, it should be appreciated that the ICE 528 can generate a high voltage control signal and a low voltage control signal. The ICE 528 can also communicate control signals to the multiplexer 514. The multiplexer 514 can select an input in response to a control signal received from the ICE 528. For example, if the ICE 528 communicates a high control signal to the multiplexer 514, then the multiplexer 408 can create a path between the ISR 526 and the adder 512. However, if the ICE 528 communicates a low control signal to the multiplexer 514, then the multiplexer 514 can create a path between the unit delay 522 and the adder 512. In such a scenario, a previous look up table address is fed back to the adder 512. The invention is not limited in this regard.

The advance device 510 is coupled to the adder 512. The advance device 510 may be an external device configured to compute an acc-dec variable v using certain time information. For example, the advance device 510 can obtain the present time (12:30 pm Dec. 31, 2008), obtain an initial time (12:30 pm Dec. 31, 2007), and compute the difference between the two (2) times. Once the time difference is computed, the advance device 510 can determine the number of cycles or clock ticks (e.g., 1,000,000) that occurred during the computed time (i.e., the time from the initial time to the present time=1 year). The invention is not limited in this regard.

The advance device 510 can also compute an acc-dec variable v using the determined number of cycles or clock ticks (e.g., 1,000,000). For example, if a chaotic sequence generation process is to be accelerated by one million (1,000,000) cycles at an initial time t and P equals five-hundred eleven (511), then the acc-dec variable v provided by the advance device 510 is 484 (i.e., v=1,000,000 modulo 511). The invention is not limited in this regard. It should be noted that the advance device 510 need only provide the acc-dec variable v at a time index n when it is desirable to accelerate or decelerate a chaotic sequence by an arbitrary number of cycles. For example, if it is desirable to accelerate a chaotic sequence by one million (1,000,000) cycles at time index n=2, then the advance device 510 provides the acc-dec variable v only at time index n=2. The advance device 510 does not need to provide the acc-dec variable v to the adder 512 at all other times (e.g., n=0, 1, 3, 4, 5). The invention is not limited in this regard.

Referring again to FIG. 5A, the MCs 502, 506 and multiplexers 504, 508 collectively provide an accelerate/decelerate control for integer steps of timing control. According to an embodiment of the invention, the integer steps can be selected to be zero (0) steps, one (1) step, or two (2) steps. If the integer step is selected to be zero (0) steps, then a chaotic sequence will be decelerated by one (1) cycle at time index n. If the integer step is selected to be one (1) step, then the chaotic sequence will not be accelerated or decelerated by an arbitrary number of cycles at time index n. If the integer step is selected to be two (2) steps, then the chaotic sequence will be accelerated by one (1) cycle at time index n. The invention is not limited in this regard.

In this regard, it should be understood that the MC 502 is configured to control multiplexer 504. As such, the MC 502 can generate a high voltage control signal and a low voltage control signal. The MC 502 can also communicate control signals to the multiplexer 504. The multiplexer 504 can select an integer step input (e.g., 0 or 2) in response to a control signal received from the MC 502. The selected integer step input is communicated to the multiplexer 508 along a communications path 530.

Similarly, the MC 506 is configured to control multiplexer 508. Accordingly, the MC 506 can generate a high voltage control signal and a low voltage control signal. The multiplexer 508 can select an integer step input (e.g., 1 or 0/2) in response to the control signal received from the MC 506. The selected integer step input (e.g., 0, 1, or 2) is communicated to the adder 512 along a communications path 532.

The adder 512 is configured to perform addition operations using a previous address received from the unit delay 522, an integer value (e.g., 0, 1, 2) received from multiplexer 508, and/or an acc-dec variable v received from the advance device 510. The adder 512 is also configured to communicate the results of the addition operations to the comparator 516, subtracter 518, and multiplexer 520 which collectively form a restricted modulo operation. The substractor 518 performs subtraction operations using results received from the adder 512 and a relatively prime number p−1, where p is $p_0$, $p_1, \ldots,$ or $p_{M-1}$ selected as moduli $m_0, m_1, \ldots,$ or $m_{M-1}$.

The comparator 516 performs comparison operations using received results from the adder 512. The comparator 516 also controls the multiplexer 520. For example, if the comparator 516 determines that a received result is less than a relatively prime number p (e.g., $p_0, p_1, \ldots,$ or $p_{M-1}$ selected as moduli $m_0, m_1, \ldots,$ or $m_{M-1}$), then the comparator can generate a first control signal for forwarding the result to an external device (not shown). Alternatively, if the comparator 516 determines that a received result is greater than a relatively prime number p, then the comparator 516 can generate a second control signal for communicating an output of the subtracter 518 to an external device (not shown).

The following discussion is provided for purposes of explaining what happens after the initial condition has been inputted to the CP 500 and how the CP 500 generates a continuous output. During normal operations, the ICE 528 will be used to select the initial condition from the ISR 526. In effect, the ICE 528 bypasses the feedback mechanism. The initial condition is an integer value representing the index of the initial condition in an external device (not shown). The initial index is communicated to the adder 512. The adder 512 increments the index value by one (1) per cycle. The incrementation of the index value is based on the selection of the MCs 502, 506. The incremented index is compared to a maximum allowable value in the RNS space. When the incremented index exceeds the maximum allowable value, a full rotation is removed. As a result, the accuracy in the RNS-based indices is retained. The index is communicated to the multiplexer 514 through the unit delay 522 for repeated incrementing and creation of a continuous evolution. The time index is incremented by two or zero (2 or 0) when a command for accelerating or decelerating the sequence by one (1) cycle is received at adder 512 from a MC 502, 506. If the acceleration or deceleration is a number of cycles greater than one (1), then the MCs 502, 506 communicate a command for incrementing the time index in accordance with multiple cycles or the advance device 510 is enabled. It should be noted that the arbitrary state can be obtained in a single cycle through wise and coordinated choice of the advance device 510 outputs.

Figure 5B:
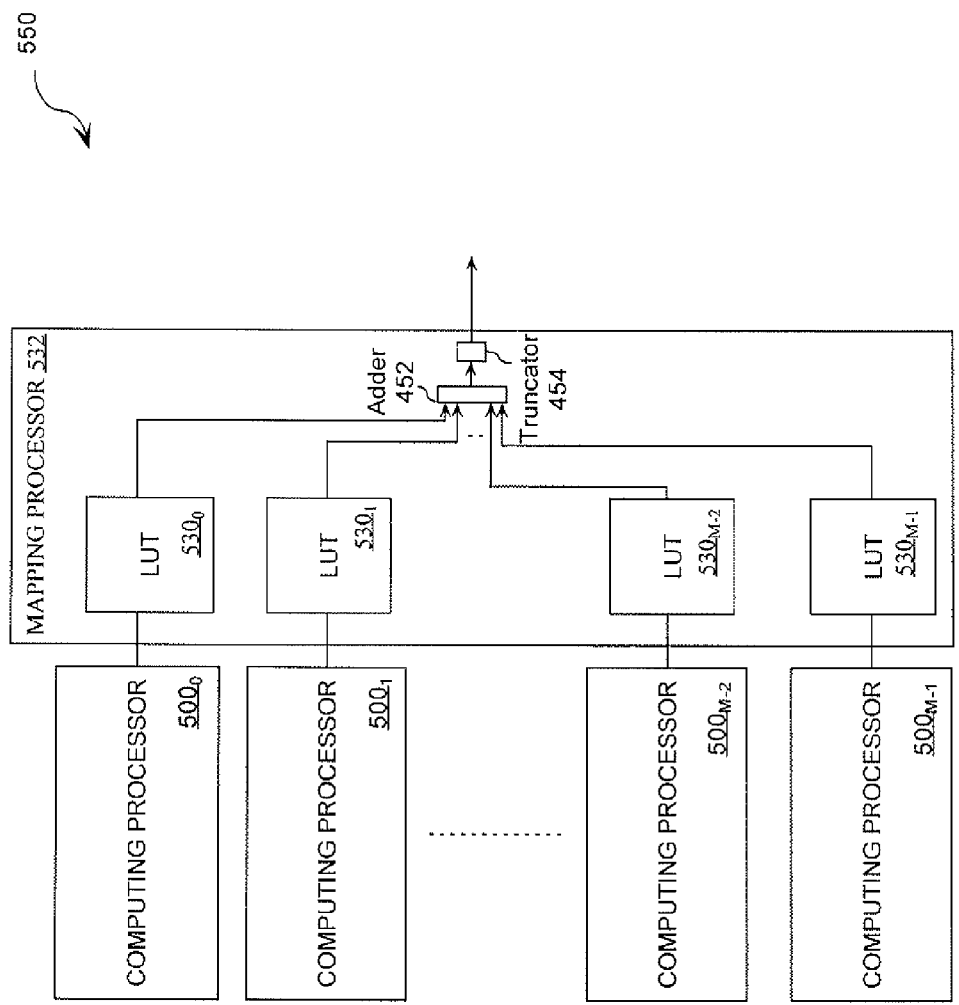

Referring now to FIG. 5B, one or more CPs 500 can be implemented in a chaotic sequence generator (CSG) 550 configured to generate a pair of quadrature Gaussian outputs. As shown in FIG. 5B, the CSG 550 is comprised of computing processors CPs $500_0, \ldots, 500_{M-1}$, and a mapping processor 532. The mapping processor 532 is comprised of lookup tables (LUTs) $530_0, \ldots, 530_{M-1}$, an adder 452, and a truncator 454. Each of the listed components 452, 454 is described above in relation to FIG. 4B. The description provided above is sufficient for understanding each of the components 452, 454.

However, it should be understood that each of the LUTs $530_0, \ldots, 530_{M-1}$ is configured to perform lookup table operations using a received input from a respective CP $500_0, \ldots, 500_{M-1}$. In this regard, it should be understood that the each of the LUTs $530_0, \ldots, 530_{M-1}$ is comprised of memory based table (not shown) containing pre-computed mapped residue values, i.e., pre-computed residue values mapped into a desired weighted number system. The look up table addresses are consecutively numbered addresses having values equal to 0, 1, 2, 3, . . . , and P–1. On each iteration, a table address is determined using the input received at the LUT $530_0, \ldots, 530_{M-1}$. The table address is used to select a pre-computed mapped residue value stored at the table address of the memory based table (not shown). Once a pre-computed mapped residue value is selected, the LUT $530_0, \ldots, 530_{M-1}$ communicates the same to the adder 452.

In light of the forgoing description of the invention, it should be recognized that the present invention can be realized in hardware, software, or a combination of hardware and software. A method for generating an accelerated or decelerated chaotic sequence according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for generating an accelerated and/or decelerated chaotic sequence, comprising the steps of:
   selecting, by at least one electronic circuit, a plurality of polynomial equations constructed from an acc-dec variable v;
   selecting, by said electronic circuit, a value for said acc-dec variable v for advancing a chaotic sequence generation by at least one cycle at a given time or stepping back said chaotic sequence generation by at least one cycle at said given time;
   using, by said electronic circuit, residue number system (RNS) arithmetic operations to respectively determine a plurality of solutions for said plurality of polynomial equations using said acc-dec variable v, said plurality of solutions iteratively computed and expressed as RNS residue values;
   determining, by said electronic circuit, a series of digits in a weighted number system based on said plurality of RNS residue values; and
   combining, by said electronic circuit, said series of digits with a sequence of symbols defining information to be stored in a storage device or transmitted over a communications link.

2. The method according to claim 1, wherein said variable v is selected to be defined by a mathematical expression c modulo $m_i$, where c is a number of cycles for acceleration or deceleration and $m_i$ is a value indicating a cycle in which a chaotic sequence starts to repeat.

3. The method according to claim 1, wherein said plurality of polynomial equations are polynomial equations $f_0[x((n+v+t)T)], \ldots, f_{M-1}[x((n+v+t)T)]$, where n is an index of time, v is a variable having a value selected to accelerate or decelerate a chaotic sequence generation by at least one cycle, t is a variable representing an initial time offset, and T is a discrete time interval.

4. The method according to claim 1, wherein said determining step further comprises identifying a number in said weighted number system that is defined by said plurality of RNS residue values.

5. The method according to claim 1, wherein a value is selected for each of M moduli in an RNS used for solving each of said plurality of polynomial equations.

6. The method according to claim 1, wherein each said plurality of polynomial equations is selected to be identical exclusive of a constant value.

7. The method according to claim 6, wherein said constant value is selected so that a polynomial equation is irreducible for a predefined modulus.

8. A device comprising a non-transitory computer-readable medium, having stored thereon a computer program for generating an accelerated and/or decelerated chaotic sequence, the computer program having a plurality of code sections executable by a computer to cause the computer to perform the steps of:
  selecting a plurality of polynomial equations constructed from an acc-dec variable v;
  selecting a value for said acc-dec variable v for advancing a chaotic sequence generation by at least one cycle at a given time or stepping back said chaotic sequence generation by at least one cycle at said given time;
  using residue number system (RNS) arithmetic operations to respectively determine a plurality of solutions for said plurality of polynomial equations using said acc-dec variable v, said plurality of solutions iteratively computed and expressed as RNS residue values;
  determining a series of digits in a weighted number system based on said plurality of RNS residue values; and
  combining said series of digits with a sequence of symbols defining information to be stored in a storage device or transmitted over a communications link.

9. The device according to claim 8, wherein said variable v is defined by a mathematical expression c modulo $m_i$, where c is a number of cycles for acceleration or deceleration and $m_i$ is a value indicating a cycle in which a chaotic sequence starts to repeat.

10. The device according to claim 8, wherein said plurality of polynomial equations are polynomial equations $f_0[x((n+v+t)T)], \ldots, f_{M-1}[x((n+v+t)T)]$, where n is an index of time, v is a variable having a value selected to accelerate or decelerate a chaotic sequence generation by at least one cycle, t is a variable representing an initial time offset, and T is a discrete time interval.

11. The device according to claim 8, further comprising code sections for causing said computer to determine a series of digits in said weighted number system by identifying a number in said weighted number system that is defined by said plurality of RNS residue values.

12. The device according to claim 8, wherein each said polynomial equation is irreducible.

13. The device according to claim 8, wherein each said plurality of polynomial equations is identical exclusive of a constant value.

14. The device according to claim 13, wherein said constant value is selected so that a polynomial equation is irreducible for a predefined modulus.

15. A chaotic sequence generator, comprising:
  at least one processing device configured to
    use residue number system (RNS) arithmetic operations to respectively determine a plurality of solutions for a plurality of polynomial equations using an acc-dec variable v, said plurality of solutions iteratively computed and expressed as RNS residue values,
    determine a series of digits in a weighted number system based on said plurality of RNS residue values, and
    combine said series of digits with a sequence of symbols defining information to be stored in a storage device or transmitted over a communications link;
  wherein said plurality of polynomial equations are constructed from said acc-dec variable v, and said acc-dec variable v has a value selected for advancing a chaotic sequence generation by at least one cycle at a given time or stepping back said chaotic sequence generation by at least one cycle at said given time.

16. The chaotic sequence generator according to claim 15, wherein said variable v is defined by a mathematical expression c modulo $m_i$, where c is a number of cycles for acceleration or deceleration and $m_i$ is a value indicating a cycle in which a chaotic sequence starts to repeat.

17. The chaotic sequence generator according to claim 15, wherein said plurality of polynomial equations are polynomial equations $f_0[x((n+v+t)T)], \ldots, f_{M-1}[x((n+v+t)T)]$, where n is an index of time, v is a variable having a value selected to accelerate or decelerate a chaotic sequence generation by at least one cycle, t is a variable representing an initial time offset, and T is a discrete time interval.

18. The chaotic sequence generator according to claim 15, wherein said at least one processing device is further configured to identify a number in said weighted number system that is defined by said plurality of RNS residue values.

19. The chaotic sequence generator according to claim 15, wherein said plurality of polynomial equations are identical exclusive of a constant value.

20. The chaotic sequence generator according to claim 19, wherein said constant value is selected so that a polynomial equation is irreducible for a predefined modulus.

* * * * *